US012058489B2

(12) United States Patent
Vautrin

(10) Patent No.: US 12,058,489 B2
(45) Date of Patent: Aug. 6, 2024

(54) PORTABLE DEVICE MICROPHONE STATUS INDICATOR

(71) Applicant: Sonos, Inc., Santa Barbara, CA (US)

(72) Inventor: Jodi Vautrin, Boston, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/334,866

(22) Filed: Jun. 14, 2023

(65) Prior Publication Data

US 2023/0421943 A1 Dec. 28, 2023

Related U.S. Application Data

(63) Continuation of application No. 17/717,049, filed on Apr. 9, 2022, now Pat. No. 11,716,562, which is a continuation of application No. 17/074,087, filed on Oct. 19, 2020, now Pat. No. 11,303,988.

(60) Provisional application No. 62/916,583, filed on Oct. 17, 2019.

(51) Int. Cl.
*H04R 1/10* (2006.01)
*G08B 5/36* (2006.01)

(52) U.S. Cl.
CPC ............. *H04R 1/1041* (2013.01); *G08B 5/36* (2013.01)

(58) Field of Classification Search
CPC ................................ H04R 1/1041; G08B 5/36
See application file for complete search history.

(56) References Cited

U.S. PATENT DOCUMENTS

| | | | |
|---|---|---|---|
| 5,440,644 A | 8/1995 | Farinelli et al. | |
| 5,761,320 A | 6/1998 | Farinelli et al. | |
| 5,923,902 A | 7/1999 | Inagaki | |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Simon King
(74) *Attorney, Agent, or Firm* — Akerman LLP

(57) ABSTRACT

A method performed by a portable playback device comprises receiving, via the portable playback device, a power activation indication. In response to receiving the power activation indication, power is supplied to at least one exterior visual indicator disposed on an outward-facing portion of an earcup of the portable playback device via a first power supply path of the portable playback device. A microphone activation indication associated with at least one microphone of the portable playback device is received. In response to receiving the microphone activation indication, microphone circuitry associated with the at least one microphone activated. An interior visual indicator disposed within a user-facing surface of the earcup of the portable playback device is illuminated. The interior visual indicator is positioned such that when the portable playback device is worn by a user, a state of the microphone status visual indicator is concealed. And when the portable playback device is not worn by the user, a state of the microphone status visual indicator is visible.

20 Claims, 24 Drawing Sheets

(56) References Cited

U.S. PATENT DOCUMENTS

| | | | | |
|---|---|---|---|---|
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 9,507,155 | B2 | 11/2016 | Morimoto | |
| 11,222,648 | B1 * | 1/2022 | Hansen | A61M 16/024 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2005/0195996 | A1 * | 9/2005 | Dunn | H04R 25/554<br>381/105 |
| 2007/0142944 | A1 | 6/2007 | Goldberg et al. | |
| 2015/0326973 | A1 * | 11/2015 | Marrin | H04R 5/027<br>381/309 |
| 2017/0099539 | A1 | 4/2017 | Di Censo et al. | |
| 2018/0074351 | A1 | 3/2018 | Smoot | |
| 2018/0091639 | A1 * | 3/2018 | Soffer | H04M 1/2535 |
| 2018/0210492 | A1 | 7/2018 | Chen et al. | |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Non-Final Office Action mailed on Nov. 30, 2022, issued in connection with U.S. Appl. No. 17/717,049, filed Apr. 9, 2022, 7 pages.

Notice of Allowance mailed on Dec. 1, 2021, issued in connection with U.S. Appl. No. 17/074,087, filed Oct. 19, 2020, 10 pages.

Notice of Allowance mailed on Mar. 15, 2023, issued in connection with U.S. Appl. No. 17/717,049, filed Apr. 9, 2022, 9 pages.

Palm, Inc., "Handbook for the Palm VII Handheld," May 2000, 311 pages.

Presentations at WinHEC 2000, May 2000, 138 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

PORTABLE DEVICE MICROPHONE STATUS INDICATOR

CROSS-REFERENCE TO RELATED APPLICATIONS

This application claims priority under 35 U.S.C. § 120 to and is a continuation of U.S. application Ser. No. 17/717,049, titled "Portable Device Microphone Status Indicator," filed on Apr. 9, 2022, which claims priority under 35 U.S.C. § 120 to and is a continuation of U.S. application Ser. No. 17/074,087, titled "Portable Device Microphone Status Indicator," filed on Oct. 19, 2020, and issued as U.S. Pat. No. 11,303,988 on Apr. 12, 2022, which claims priority under 35 U.S.C. § 119 to U.S. Prov. App. 62/916,583, titled "Portable Device Microphone Status Indicator," filed Oct. 17, 2019. The content of all of these applications is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until, in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
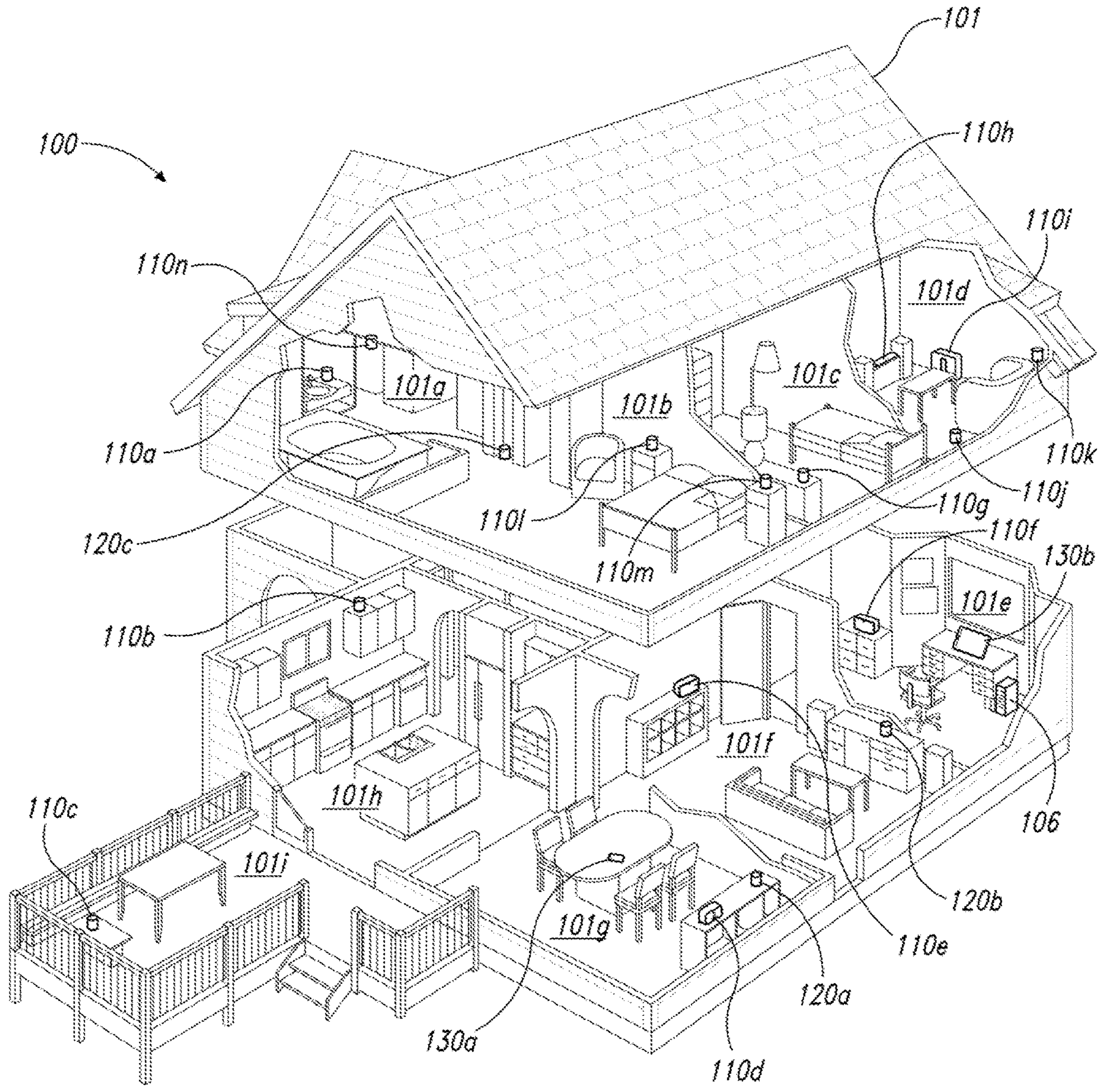
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Examples described herein relate to a portable playback device that includes one or more microphones that facilitate performing operations such as noise-canceling, processing voice commands, etc. An example of the portable playback device includes a visual indicator that is hardwired to the microphones such that the visual indicator visually indicates to a user whether any of the microphones are actively receiving and processing audio content. Hardwiring of the visual indicator to the microphones mitigates the risk that malicious instruction code could activate one or more of the microphones without the user's knowledge.

An example of the portable playback device corresponds to headphones, and an example of the visual indicator corresponds to an interior visual indicator that is arranged in a discrete location of the headphones. For instance, in an example, the interior visual indicator is arranged within an earcup of the headphones. When arranged this way, the state of the interior visual indicator cannot be ascertained while the headphones are being worn. On the other hand, when the headphones are placed on a table, a user with direct line of sight to the interior of the earcup can view the interior visual indicator. In this way, the state of the interior visual indicator can be conveyed discretely to the user.

In an example, power is supplied to one or more exterior visual indicators of the portable playback device via a first power supply path. Power is supplied to the interior visual indicator via a second power supply path. Further, the first and second power supply paths are independently operated.

In some examples, the microphones are activated via user interaction with a user interface of the portable playback device. For example, the user can press a switch that activates a microphone circuit for receiving voice commands or for enabling noise cancellation. This, in turn, causes the interior visual indicator to illuminate.

In some examples, subsequent to activation of the microphone circuit, the microphone circuit deactivates after a predetermined period of inactivity of the microphone. When the microphone circuit is deactivated, the interior visual indicator transitions to an unilluminated state.

In some examples, the portable playback device includes multiple microphones. For example, the playback device includes a first microphone arranged on an outside housing of the portable playback devices that is configured to receive ambient noise and facilitate the performance of noise cancellation. A second microphone is arranged on the outside of the housing and facilitates receiving voice commands from a user of the portable playback device. A third microphone is arranged within the earcup of the portable playback device. When any of the first microphone, the second microphone, or the third microphone is actively receiving audio signals, the interior visual indicator transitions to an illuminated state, and when all of the first microphone, the second microphone, and the third microphone are deactivated, the interior visual indicator transitions to an unilluminated state.

In some examples, the interior visual indicator is configured to indicate a plurality of illuminated states. For example, a first illuminated state is associated with the activation of the first microphone. A second illuminated state is associated with activation of the second microphone. And a third illuminated state is associated with activation of the third microphone. In some examples, the various illuminated states correspond to different colors.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 includes one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 includes a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E, as well as FIGS. 1-I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones.

Example synchrony techniques involve a group coordinator providing audio content and timing information to one or more group members to facilitate synchronous playback among the group coordinator and the group members. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
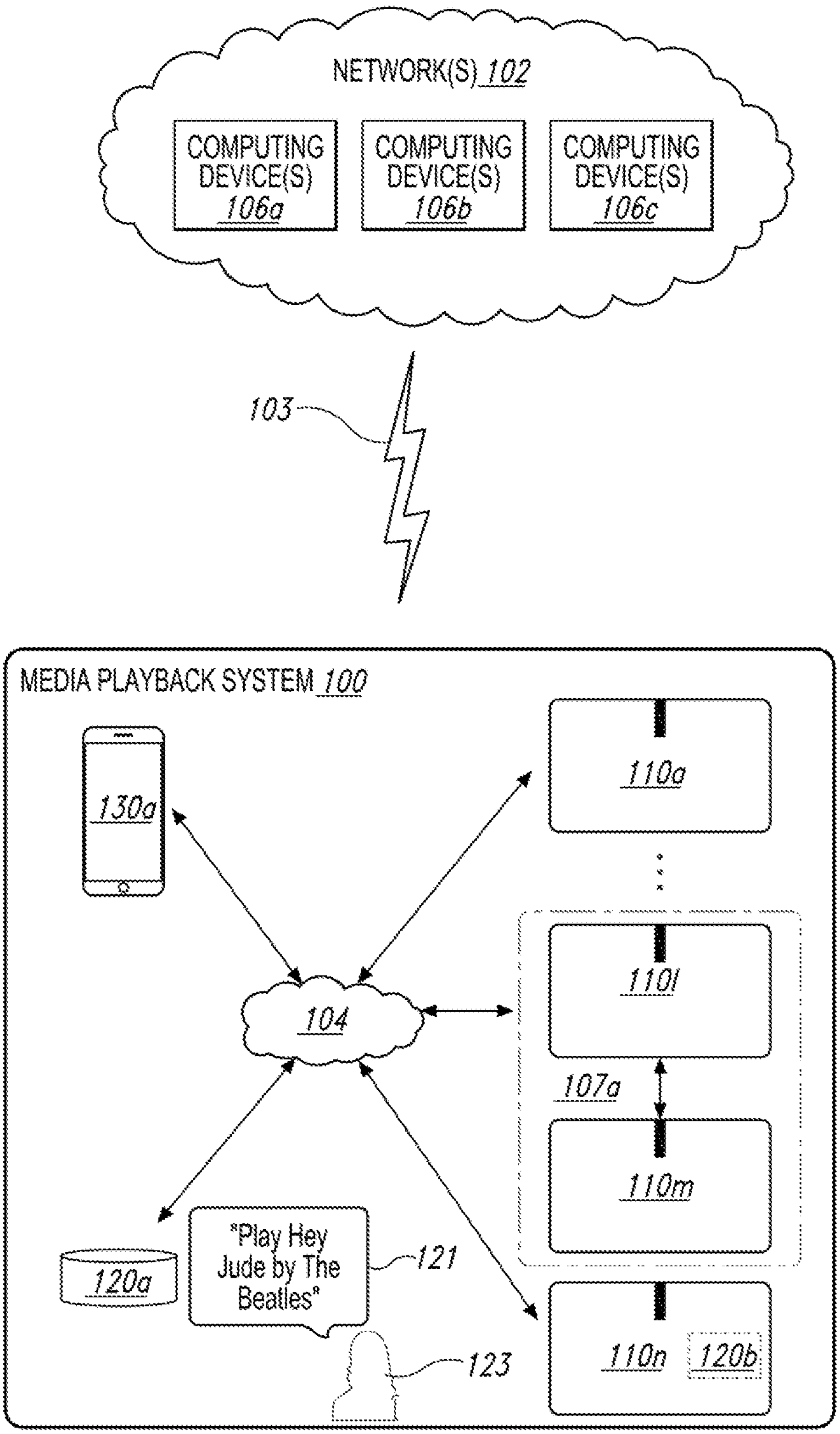
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g.

voice input data) from the media playback system 100 and correspondingly transmit commands and/or media content to the media playback system 100.

The cloud network 102 includes computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 includes a plurality of cloud networks comprising communicatively coupled computing devices. Furthermore, while the cloud network 102 is shown in FIG. 1B as having three of the computing devices 106, in some embodiments, the cloud network 102 includes fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 includes a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 includes an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* includes a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* includes one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
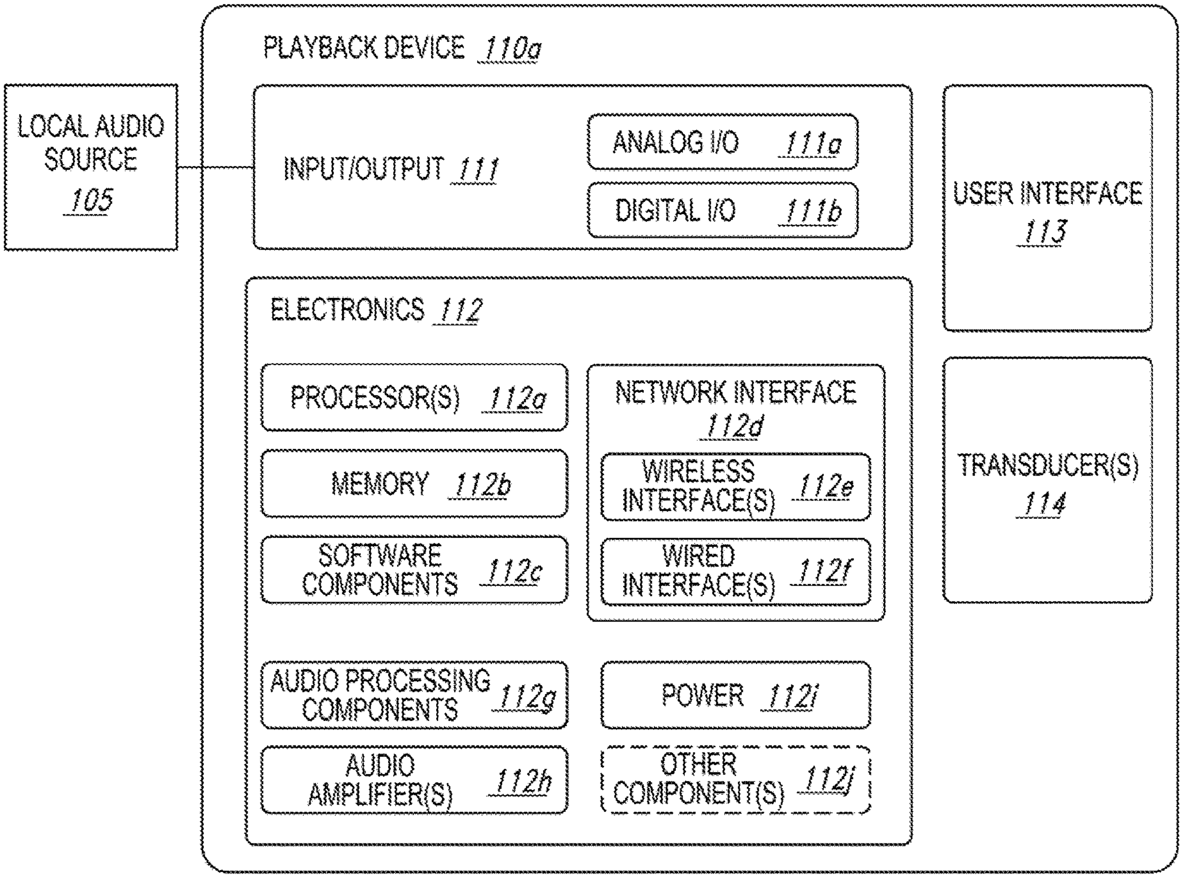
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* includes a Sony/Philips Digital Interface Format (S/PDIF) communication interface and/or cable and/or a Toshiba Link (TOSLINK) cable. In some embodiments, the digital I/O 111*b* includes an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further includes electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* includes one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
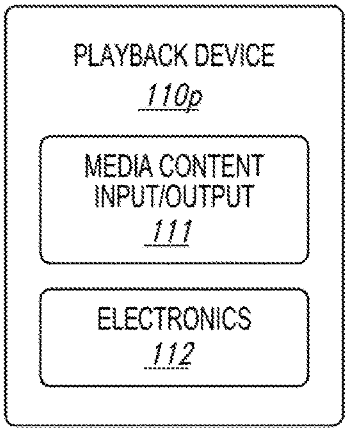
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 includes wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
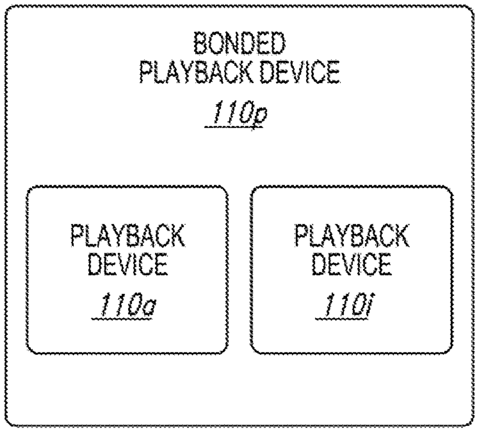
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* includes a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

Figure 1F:
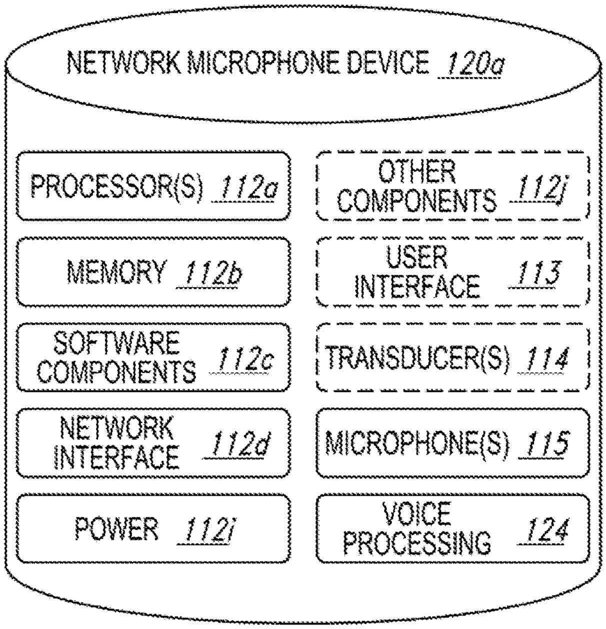
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally includes other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* includes an Internet of Things (IoT) device such as, for example, a thermostat, alarm panel, fire and/or smoke detector, etc. In some embodiments, the NMD 120*a* includes the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
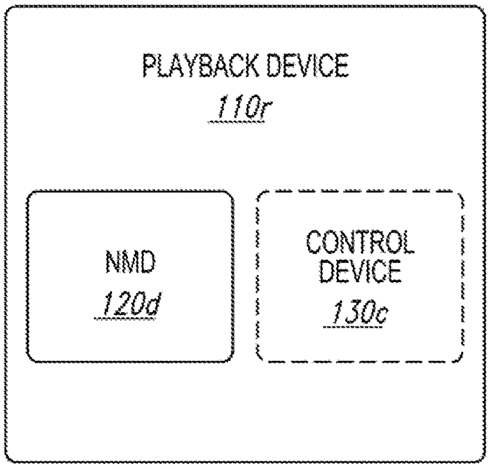
FIG. 1G is a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

Figure 1H:
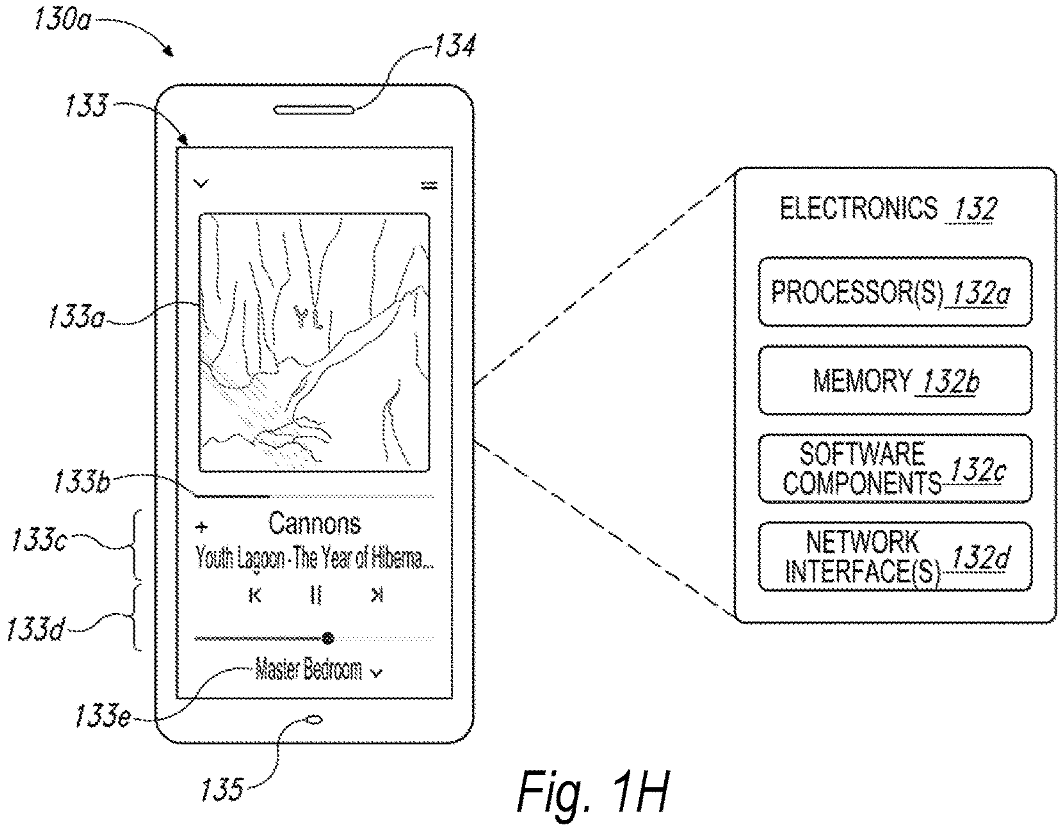
FIG. 1H is a partially schematic diagram of a control device.
Figure 1I:
FIGS. 1-I, IJ, IK, and 1L are schematic diagrams of corresponding media playback system zones.
FIG. 1M is a schematic diagram of media playback system areas.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* includes a smartphone (e.g., an iPhone™, an Android phone) on which media playback system controller application software is installed. In some embodiments, the control device 130*a* includes, for example, a tablet (e.g., an iPad™), a computer (e.g., a laptop computer, a desktop computer), and/or another suitable device (e.g., a television, an automobile audio head unit, an IoT device). In certain embodiments, the control device 130*a* includes a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 includes a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1J:
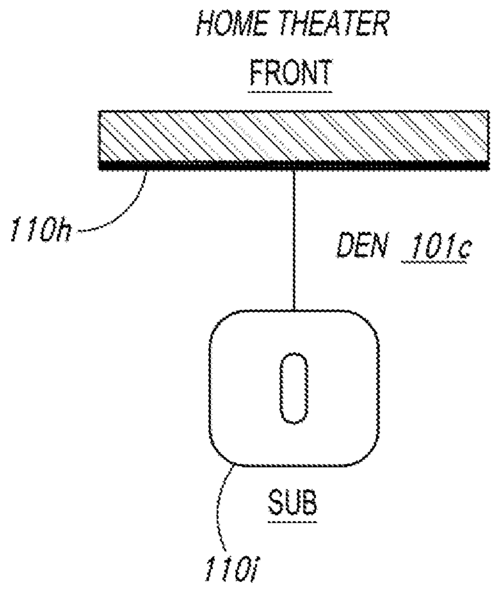
Figure 1K:
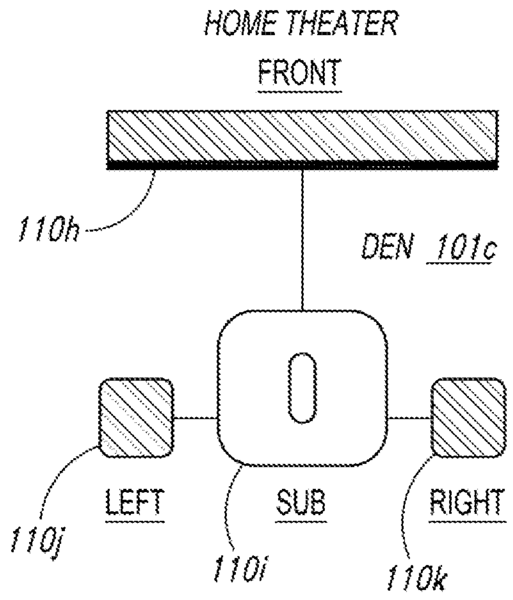
Figure 1L:
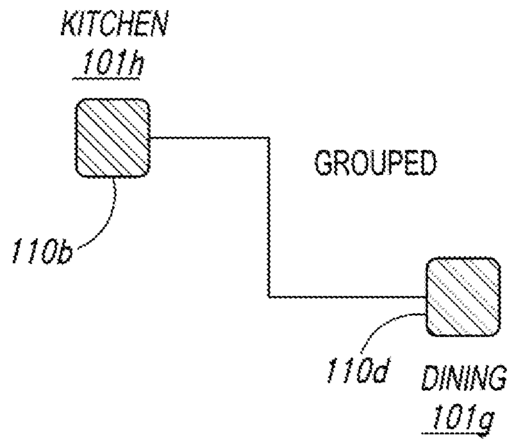
Figure 1M:
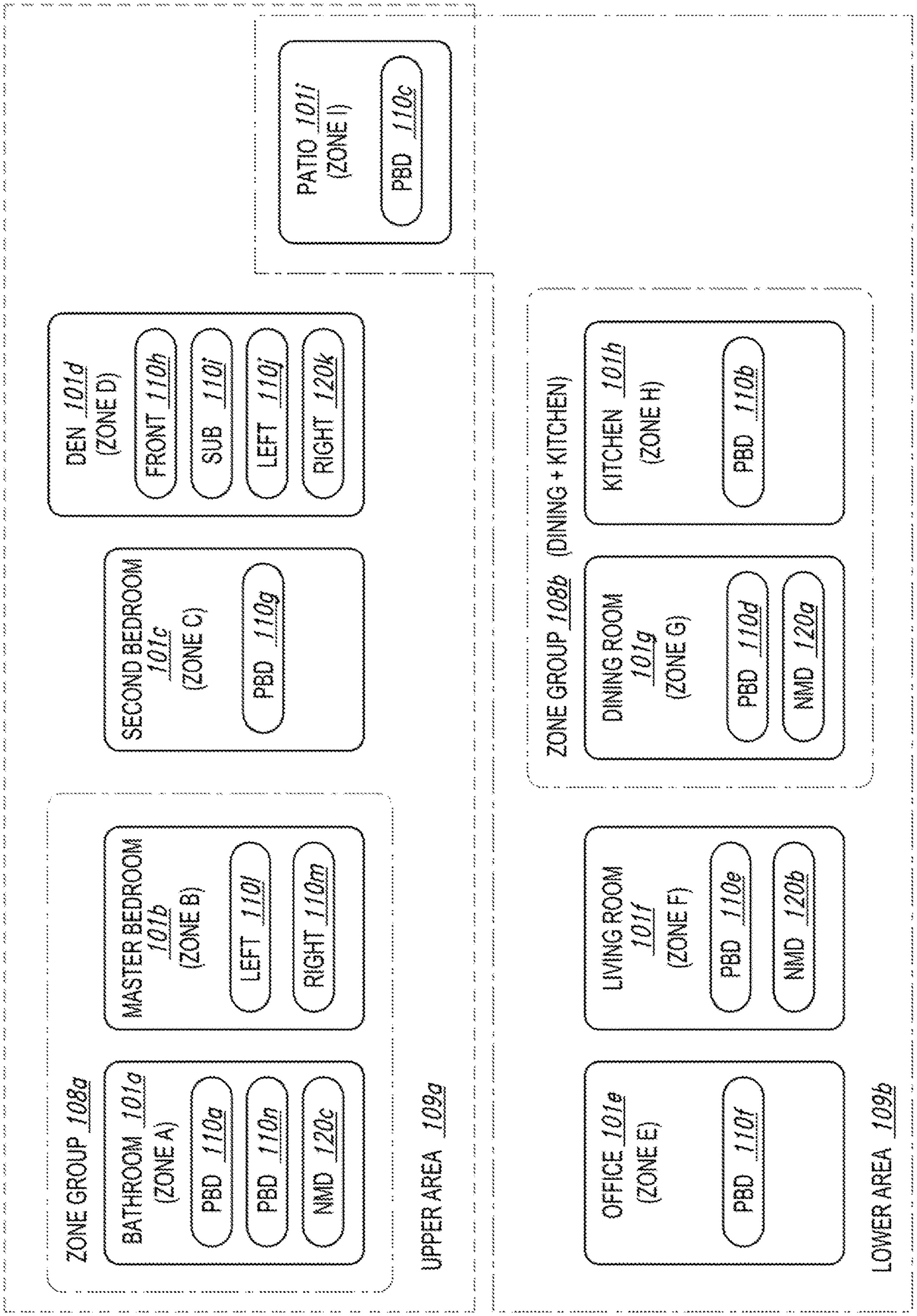

FIGS. 1-1 through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112*c* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 might not implement Areas, in which case the system may not store variables associated with Areas.

In further examples, the playback devices 110 of the media playback system 100 are named and arranged according to a control hierarchy referred to as home graph. Under the home graph hierarchy, the base unit of the home graph hierarchy is a "Set." A "Set" refers to an individual device or multiple devices that operate together in performing a given function, such as an individual playback device 110 or a bonded zone of playback devices. After Sets, the next level of the hierarchy is a "Room." Under the home graph hierarchy, a "Room" can be considered a container for Sets in a given room of a home. For example, an example Room might correspond to the kitchen of a home, and be assigned the name "Kitchen" and include one or more Sets (e.g. "Kitchen Island"). The next level of the example home graph hierarchy is "Area," which includes two or more Rooms (e.g., "Upstairs" or "Downstairs"). The highest level of the home graph hierarchy is "Home." A Home refers to the entire home, and all of the Sets within. Each level of the home graph hierarchy is assigned a human-readable name, which facilities control via GUI and VUI. Additional details regarding the home graph control hierarchy can be found, for example, in U.S. patent application Ser. No. 16/216,357 entitled, "Home Graph," which is incorporated herein by reference in its entirety.

III. Example Systems and Devices

Figure 2A:
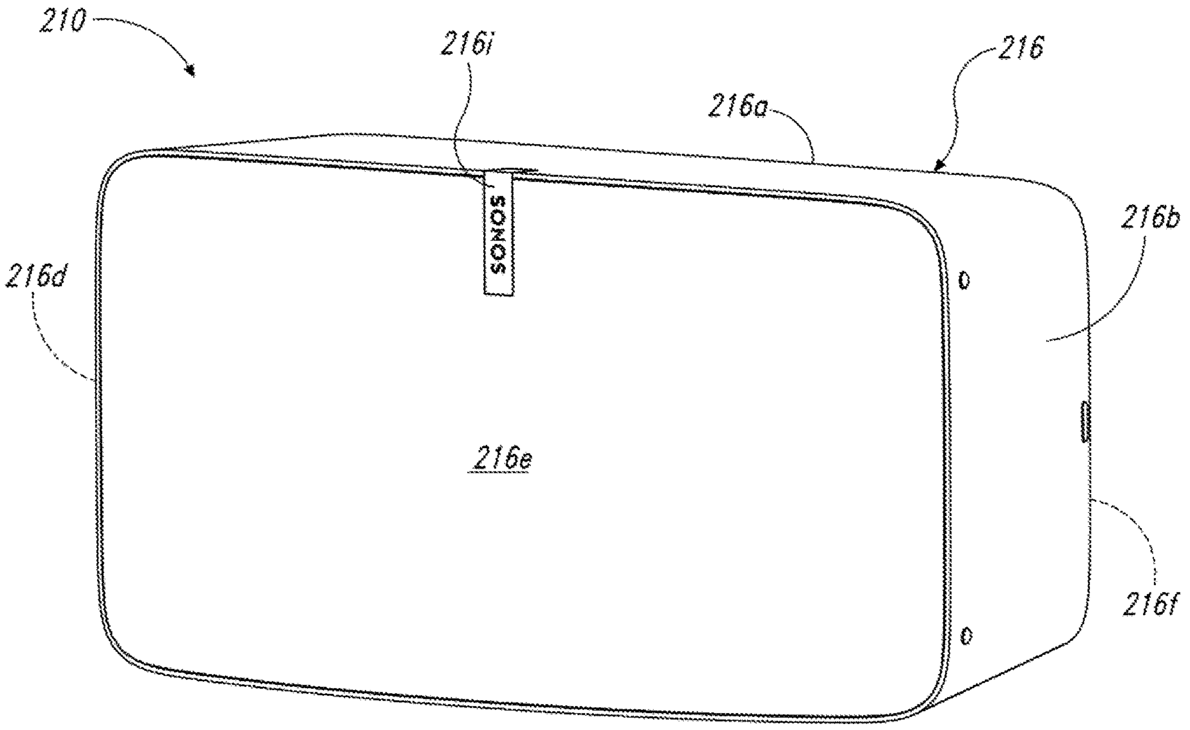
FIG. 2A is a front isometric view of a playback device configured in accordance with aspects of the disclosed technology.
Figure 2B:
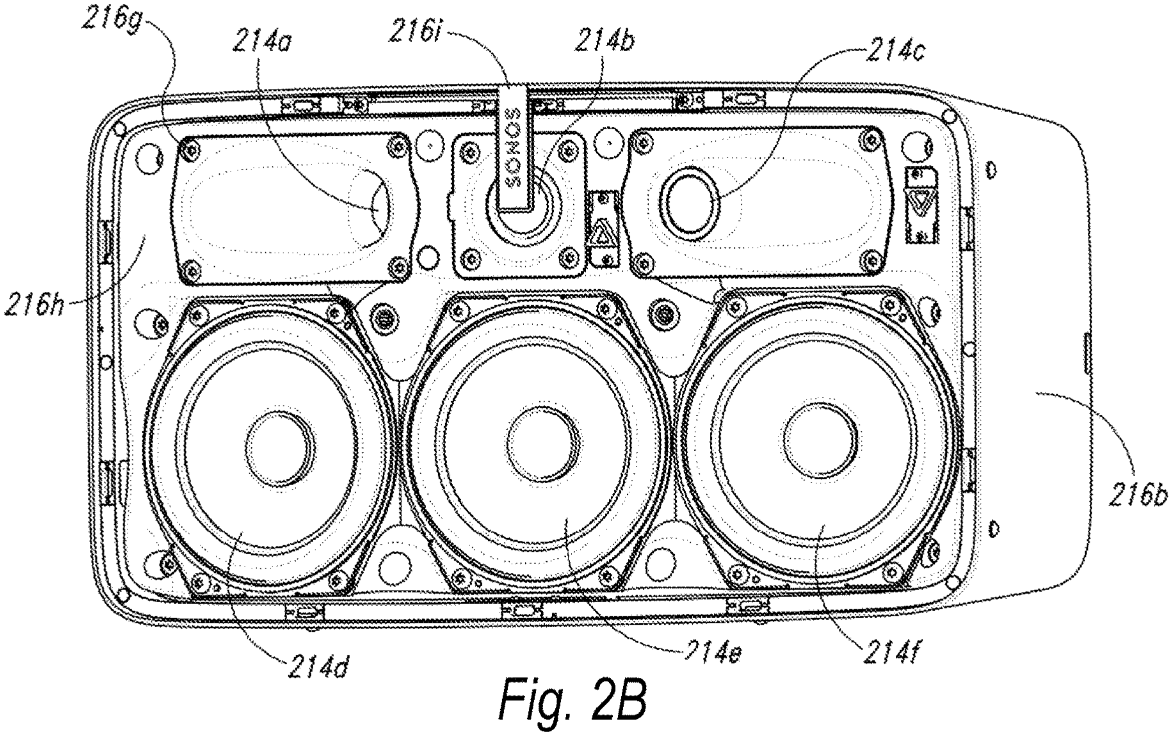
FIG. 2B is a front isometric view of the playback device of FIG. 3A without a grille.
Figure 2C:
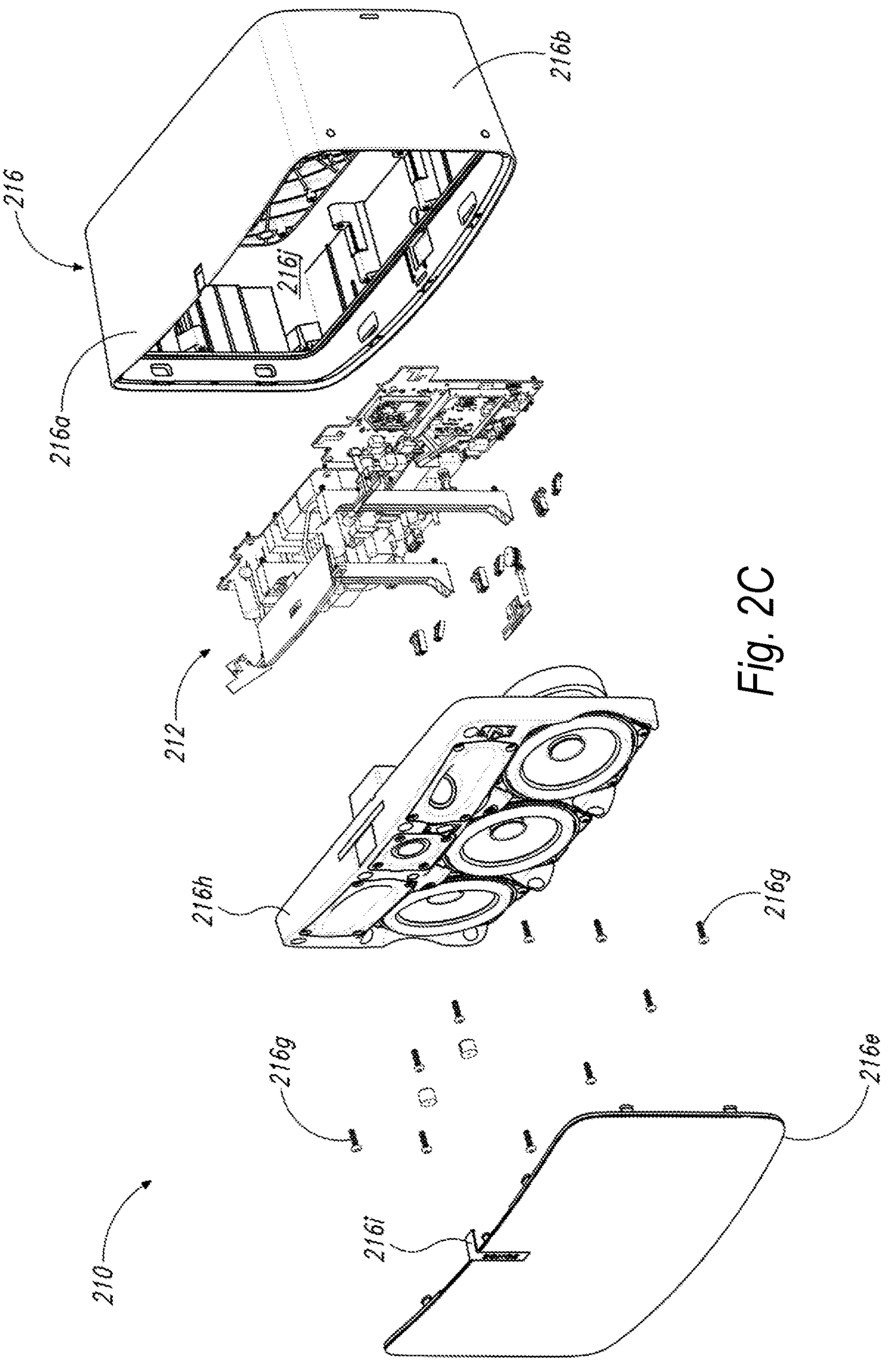
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216*e*. FIG. 2C is an exploded view of the playback device 210. Referring to FIGS. 2A-2C together, the playback device 210 includes a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figure 3A:
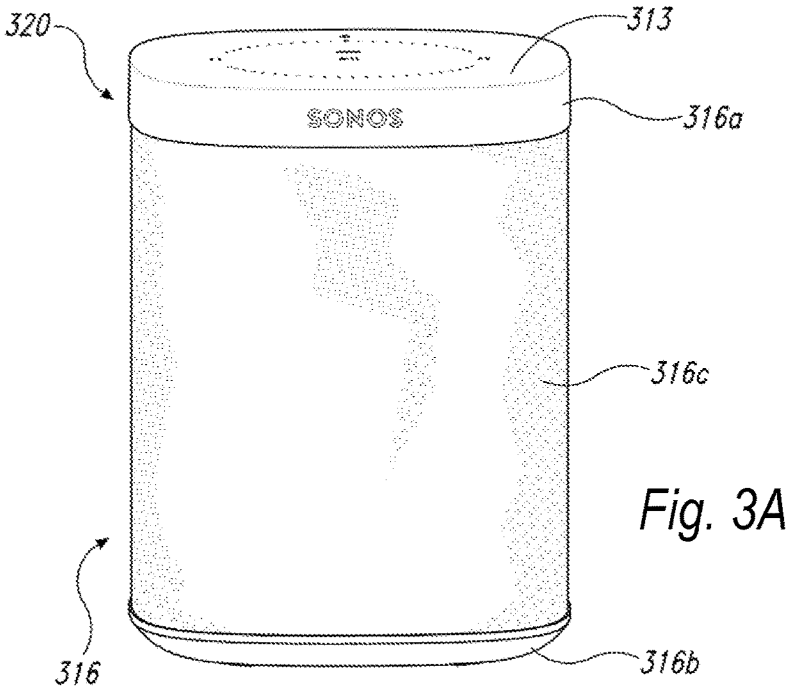
FIG. 3A is a front view of a network microphone device configured in accordance with aspects of the disclosed technology.
Figure 3B:
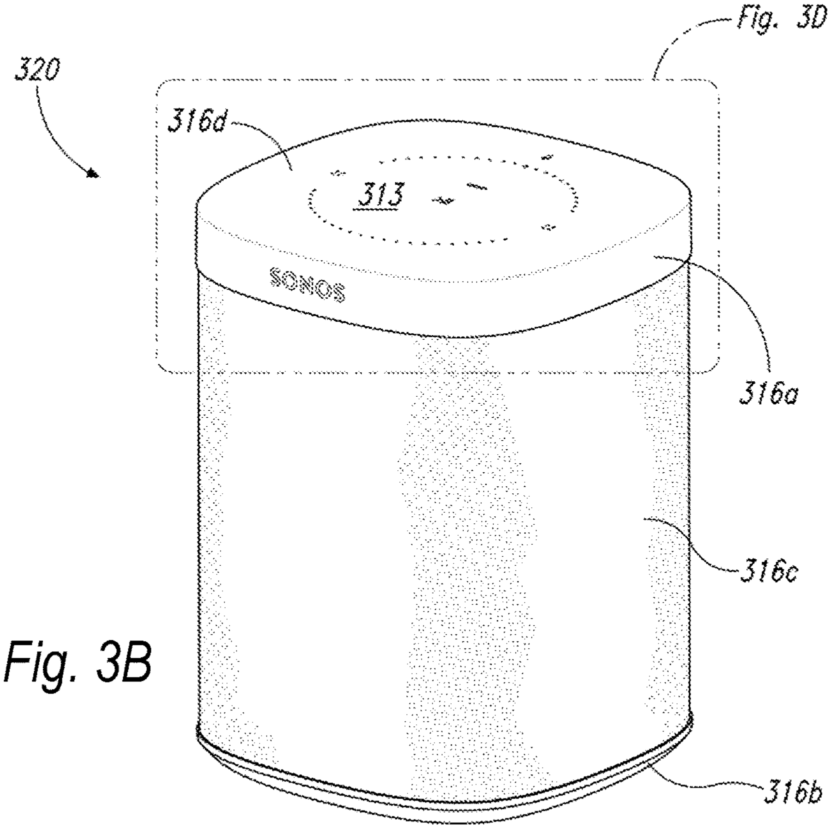
FIG. 3B is a side isometric view of the network microphone device of FIG. 3A.
Figure 3C:
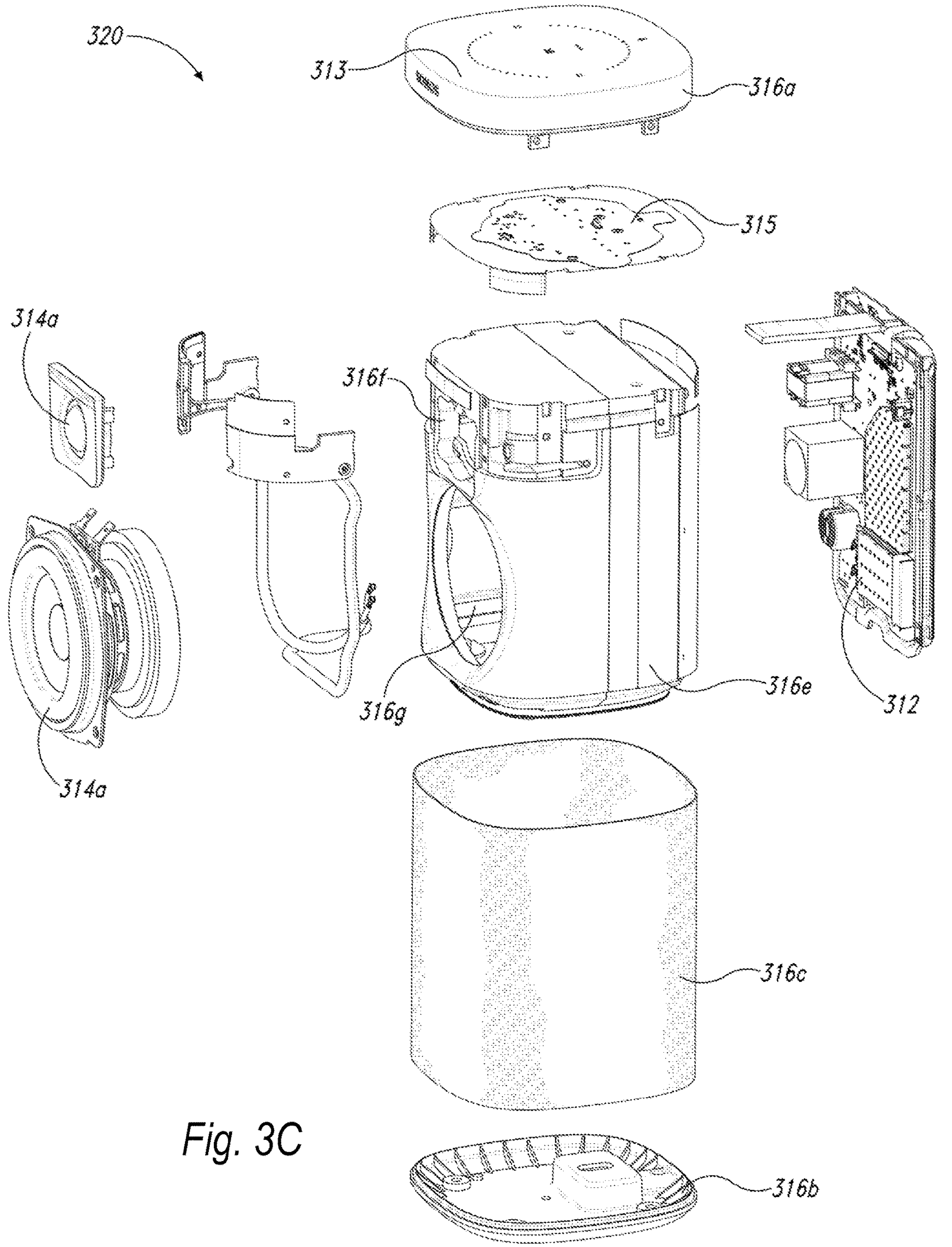
FIG. 3C is an exploded view of the network microphone device of FIGS. 3A and 3B.
Figure 3D:
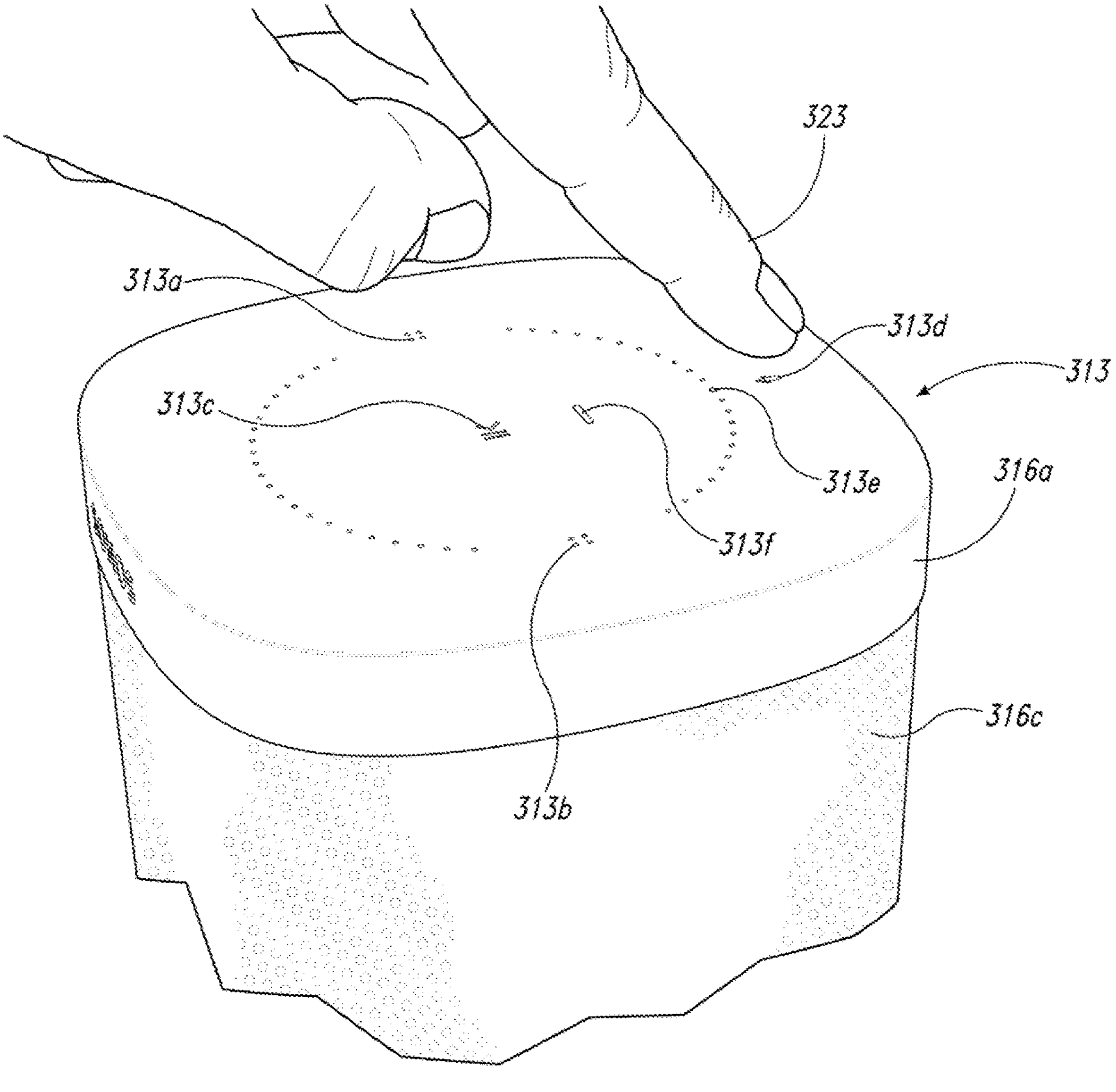
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 (FIG. 3C) positioned within the housing 316. The one or more microphones 316 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f* Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10*m* or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 4A:
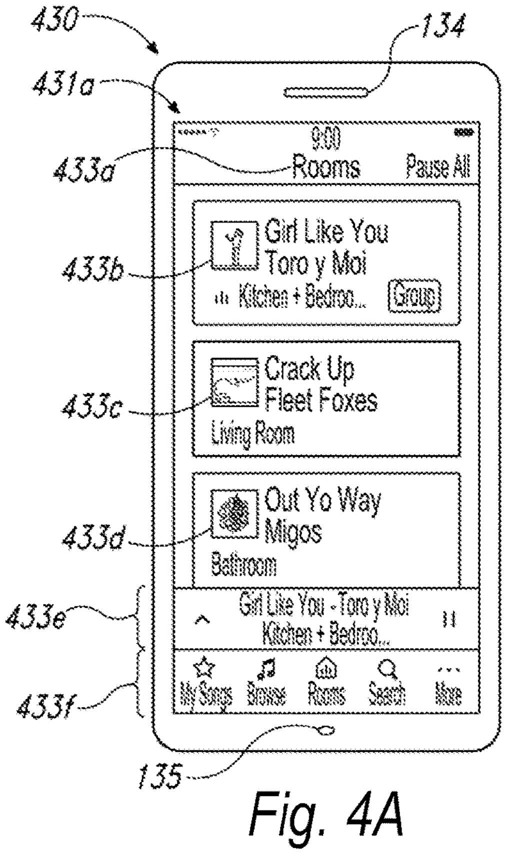
FIGS. 4A, 4B, 4C, and 4D are schematic diagrams of a control device in various stages of operation in accordance with aspects of the disclosed technology.
Figure 4B:
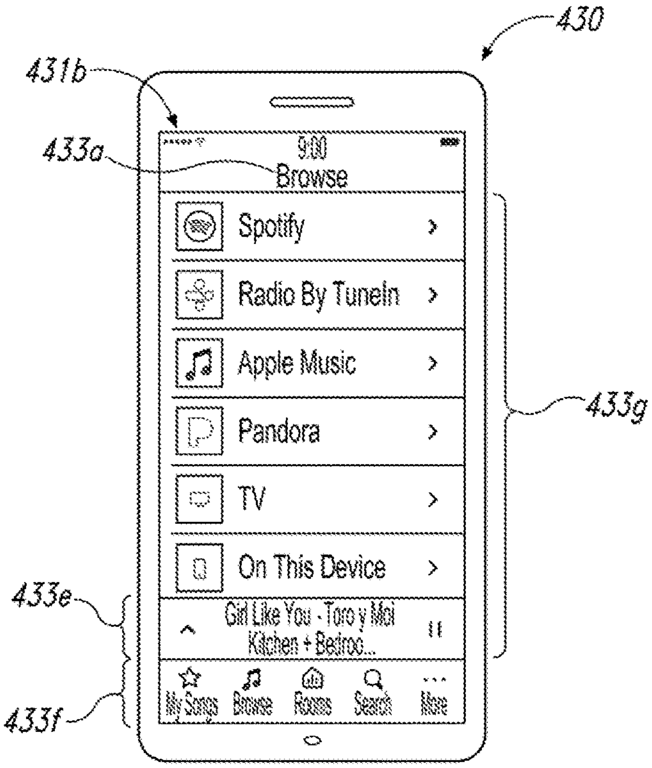
Figure 4C:
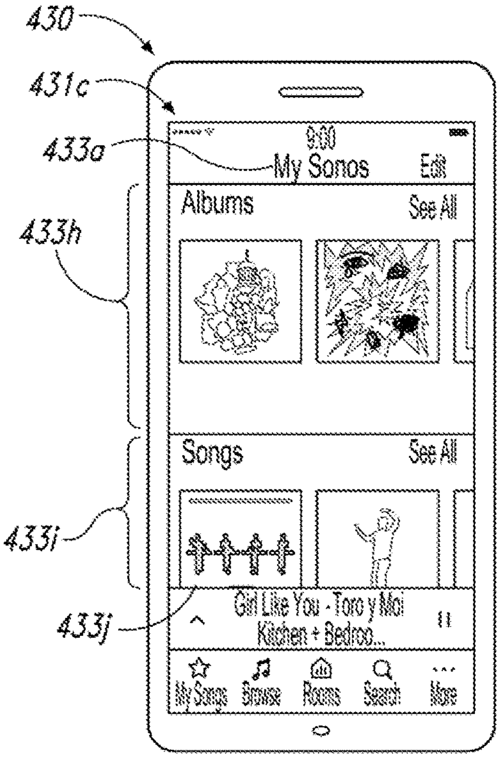
Figure 4D:
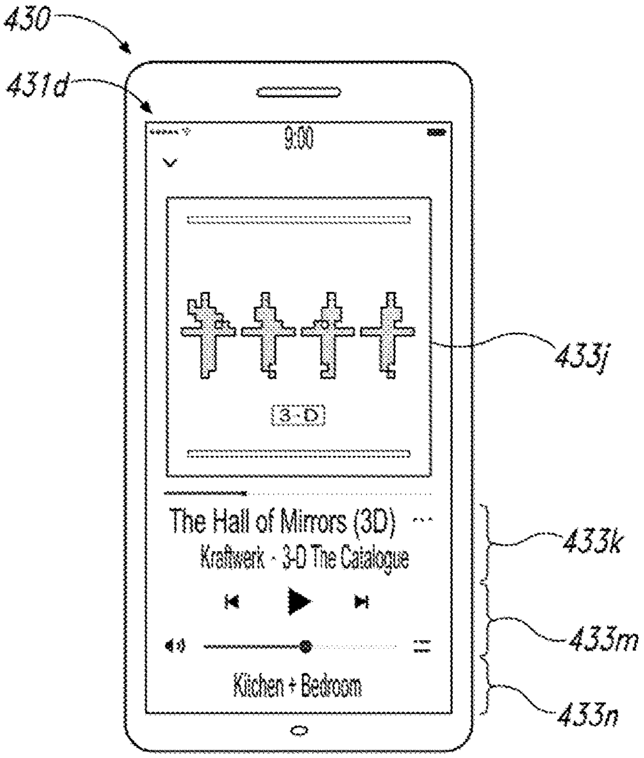

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selections a graphical representation 433*j* (FIG. 4C), the control device 430 can be configured to begin play back of audio content corresponding to the graphical representation 433*j* and output a fourth user interface display 431*d* fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
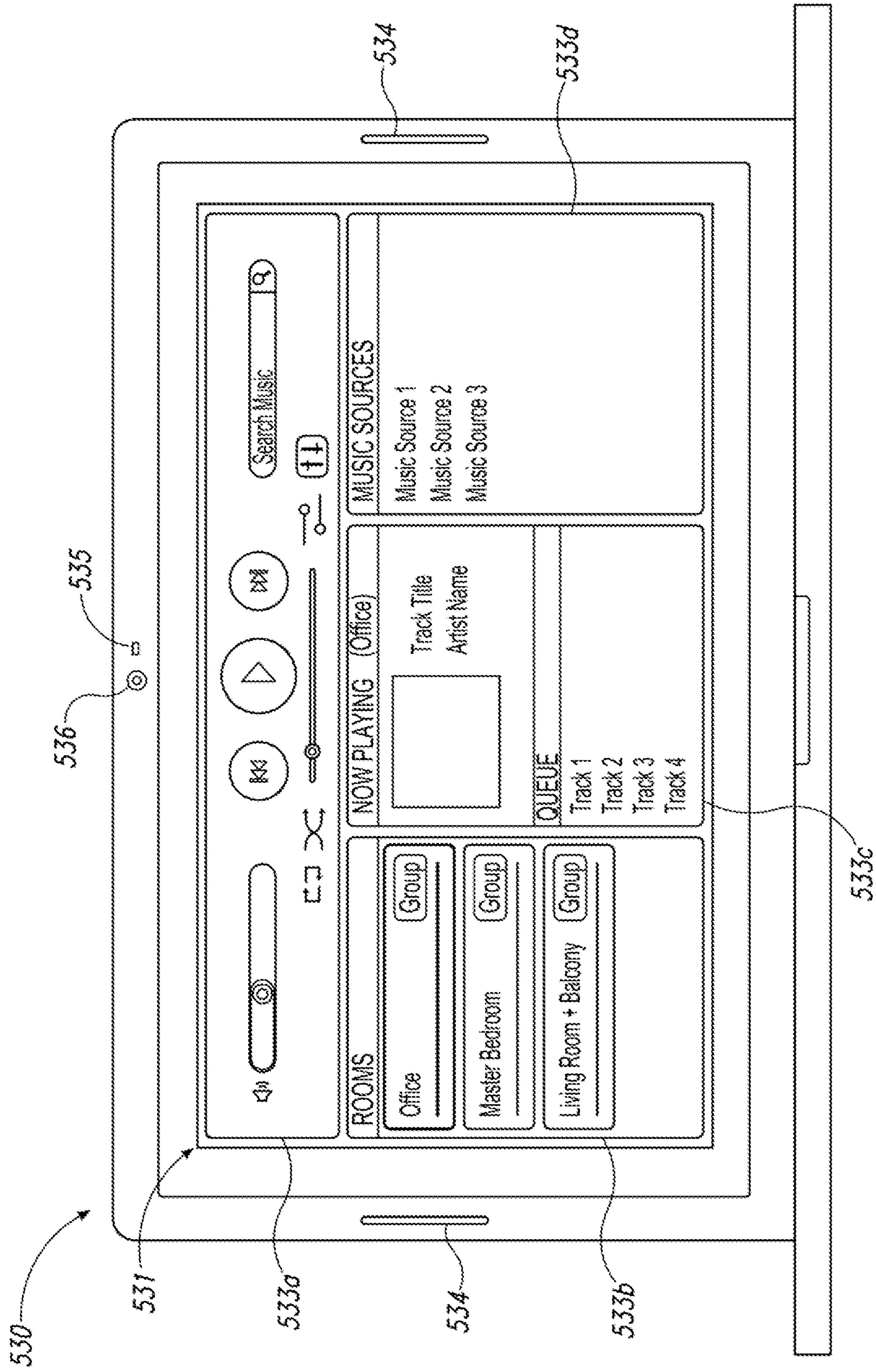
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region includes one or more controls for controlling media playback including, for example, volume, previous, play/pause, next, repeat, shuffle, track position, crossfade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
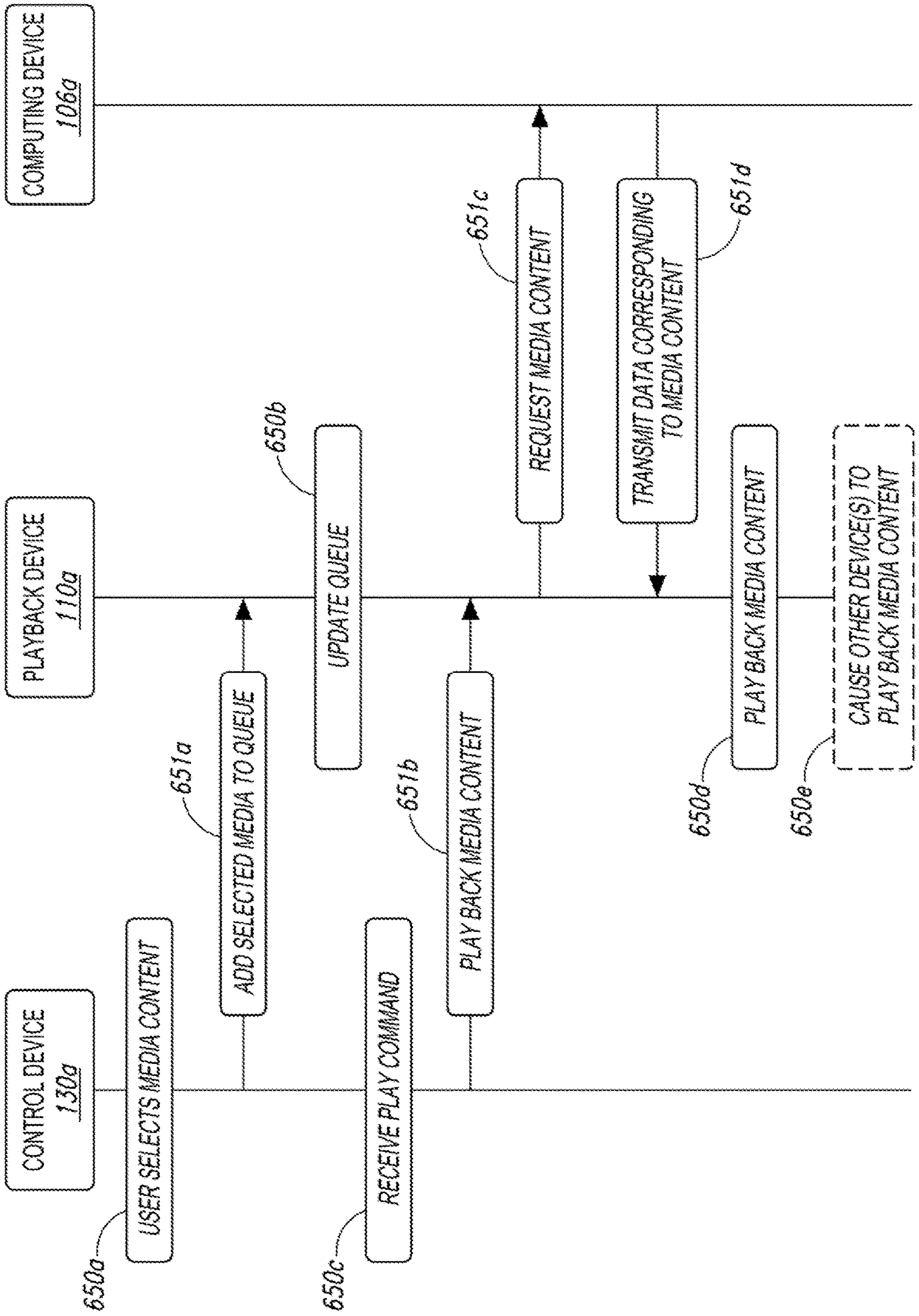
FIG. 6 is a message flow diagram of a media playback system.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130*a* transmits a message 651*b* to the playback device 110*a* causing the playback device 110*a* to play back the selected media content. In response to receiving the message 651*b*, the playback device 110*a* transmits a message 651*c* to the computing device 106*a* requesting the selected media content. The computing device 106*a*, in response to receiving the message 651*c*, transmits a message 651*d* comprising data (e.g., audio data, video data, a URL, a URI) corresponding to the requested media content.

At step 650*d*, the playback device 110*a* receives the message 651*d* with the data corresponding to the requested media content and plays back the associated media content.

At step 650*e*, the playback device 110*a* optionally causes one or more other devices to play back the selected media content. In one example, the playback device 110*a* is one of a bonded zone of two or more players (FIG. 1M). The playback device 110*a* can receive the selected media content and transmit all or a portion of the media content to other devices in the bonded zone. In another example, the playback device 110*a* is a coordinator of a group and is configured to transmit and receive timing information from one or more other devices in the group. The other one or more devices in the group can receive the selected media content from the computing device 106*a*, and begin playback of the selected media content in response to a message from the playback device 110*a* such that all of the devices in the group play back the selected media content in synchrony.

III. Example Portable Playback Device

Figure 7A:
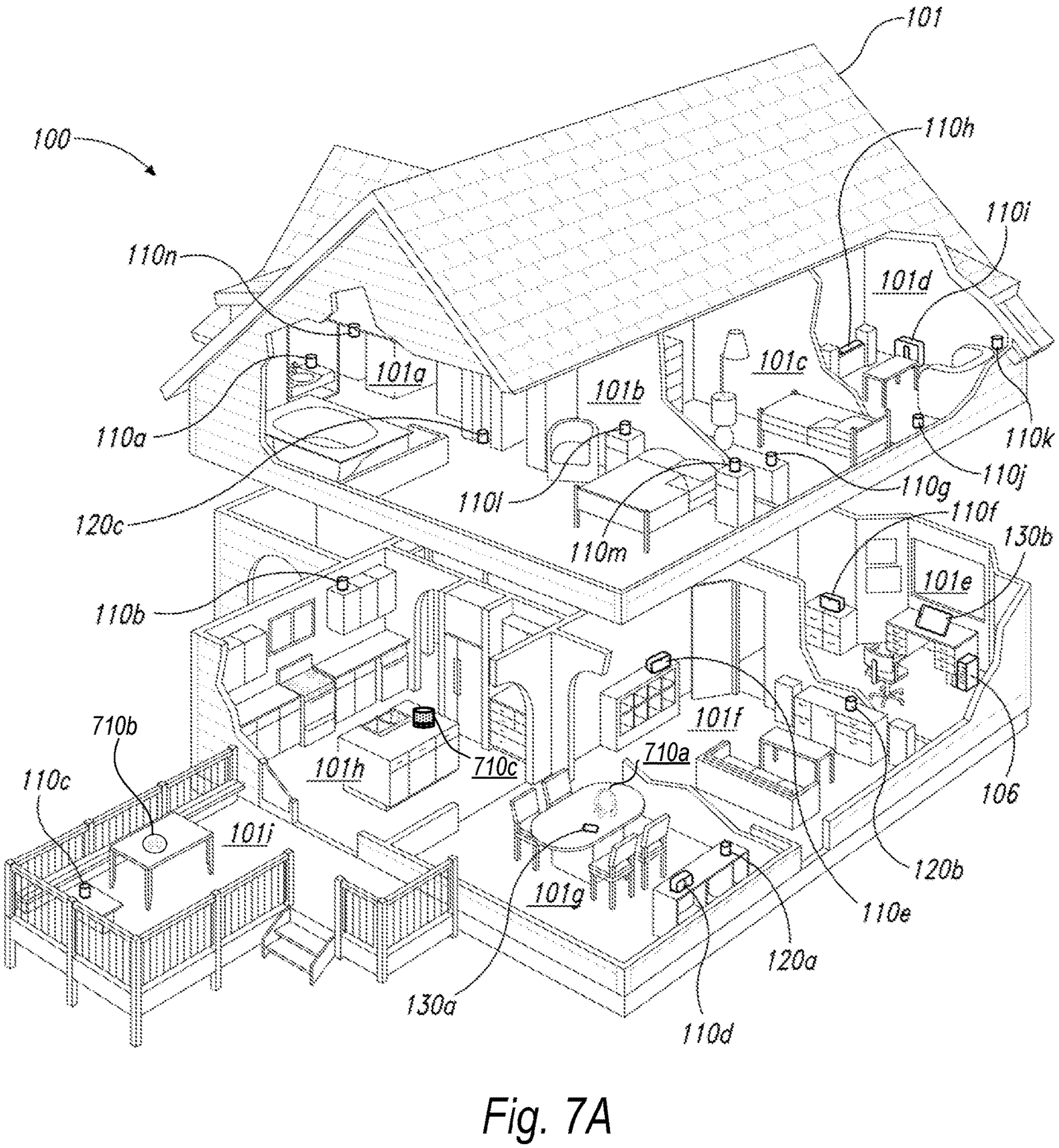
FIG. 7A is a partial cutaway view of an environment having a media playback system configured in accordance with aspects of the disclosed technology.

As noted above, certain playback device implementations may be configured for portable use. FIG. 7A is a partial cutaway view of the media playback system 100 with the inclusion of one or more portable playback devices 710 (identified individually as portable playback devices 710*a*, 710*b*, and 710*c*). The portable playback devices 710 are similar to the playback devices 110, but are configured for portable use. While they are shown in the home in FIG. 7A, the portable playback devices 710 are configured to play back audio content while in the home and while "on the go."

Figure 7B:
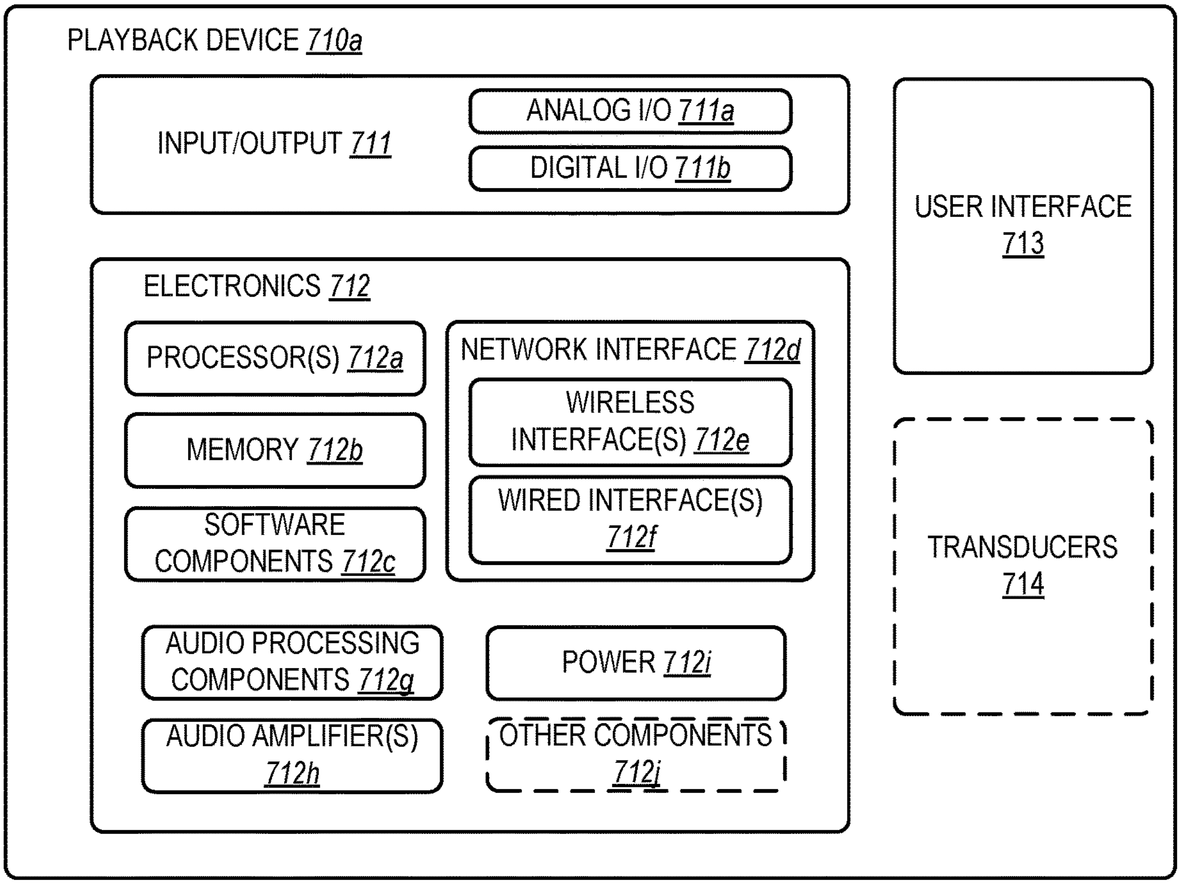
FIG. 7B is a block diagram of a portable playback device configured in accordance with aspects of the disclosed technology.

As shown in the block diagram of FIG. 7B, a portable playback device 710*a* includes the same or similar components as the playback device 110*a*. However, to facilitate portable use, the playback device 710*a* may be implemented in a certain form factor (e.g., headphones or earbuds) and includes one or more batteries in power 712*i* to provide portable power.

Referring to FIG. 7B, the portable playback device 710*a* includes an input/output 711, which can include an analog I/O 711*a* and/or a digital I/O 711*b* similar to the components of the playback device 110. To facilitate portable usage, the input/output 711 of the portable playback device 710*a* may include an interface (such as a Bluetooth interface) to facilitate connection to a bridge device (e.g., a mobile device), which the portable playback device 710*a* may use to stream audio content and otherwise communicate with the bridge device.

The playback device 710*a* further includes electronics 712, a user interface 713 (e.g., one or more buttons, knobs, dials, touch-sensitive surfaces, displays, touchscreens), and one or more transducers 714 (referred to hereinafter as "the transducers 714"). The electronics 712 is configured to receive audio from an audio source via the input/output 711, one or more of the computing devices 106*a-c* via the network 104 (FIG. 1B)), amplify the received audio, and output the amplified audio for playback via one or more of the transducers 714. In some embodiments, the playback device 710*a* includes one or more microphones 715 (e.g., a single microphone, a plurality of microphones, a microphone array) (hereinafter referred to as "the microphones 715"). In certain embodiments, for example, the playback device 110*a* having one or more of the microphones 715 can operate as an NMD configured to receive voice input from a user and correspondingly perform one or more operations based on the received voice input.

In the illustrated embodiment of FIG. 7B, the electronics 712 include one or more processors 712*a* (referred to hereinafter as "the processors 112*a*"), memory 712*b*, software components 712*c*, a network interface 712*d*, one or more audio processing components 712*g* (referred to hereinafter as "the audio components 712*g*"), one or more audio amplifiers 712*h* (referred to hereinafter as "the amplifiers 712*h*"), and power 712*i* (e.g., one or more power supplies, power cables, power receptacles, batteries, induction coils, Power-over Ethernet (POE) interfaces, and/or other suitable sources of electric power). In some embodiments, the electronics 712 optionally include one or more other components 712*j* (e.g., one or more sensors, video displays, touchscreens).

The network interface 712*d* is configured to facilitate a transmission of data between the playback device 710*a* and one or more other devices on a data network such as, for example, the links 103 and/or the network 104 (FIG. 1B). The network interface 712*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 712*d* can parse the digital packet data such that the electronics 712 properly receives and processes the data destined for the playback device 110*a*.

In the illustrated embodiment of FIG. 7B, the network interface 712*d* includes one or more wireless interfaces 712*e* (referred to hereinafter as "the wireless interface 712*e*"). The wireless interface 712*e* (e.g., a suitable interface comprising one or more antennae) can be configured to wirelessly communicate with one or more other devices (e.g., one or more of the playback devices 110, NMDs 120, control devices 130, other portable playback devices 710, as well as other devices disclosed herein, such as bridge devices) that are communicatively coupled to the network 104 (FIG. 1B) in accordance with a suitable wireless communication protocol (e.g., WiFi, Bluetooth, LTE). In some embodiments, the network interface 712*d* optionally includes a wired interface 712*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In some embodiments, the electronics 712 excludes the network interface 712*d* altogether and transmits and receives media content and/or other data via another communication path (e.g., the input/output 711).

The audio components 712*g* are configured to process and/or filter data comprising media content received by the electronics 712 (e.g., via the input/output 711 and/or the network interface 712*d*) to produce output audio signals. In some embodiments, the audio processing components 712*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 712*g* can comprise one or more subcomponents of the processors 712*a*. In some embodiments, the electronics 712 omits the audio processing components 712*g*. In some aspects, for example, the processors 712*a* execute instructions stored on the memory 712*b* to perform audio processing operations to produce the output audio signals.

The amplifiers 712*h* are configured to receive and amplify the audio output signals produced by the audio processing components 712*g* and/or the processors 712*a*. The amplifiers 7712*h* can comprise electronic devices and/or components configured to amplify audio signals to levels sufficient for driving one or more of the transducers 714. In some embodiments, for example, the amplifiers 712*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 712*h* comprise a suitable combination of two or more of the foregoing types of power amplifiers. Moreover, in some embodiments, individual ones of the amplifiers 712*h* correspond to individual ones of the transducers 714. In other embodiments, however, the electronics 712 includes a single one of the amplifiers 712*h* configured to output amplified audio signals to a plurality of the transducers 714.

The transducers 714 (e.g., one or more speakers and/or speaker drivers) receive the amplified audio signals from the amplifier 712*h* and render or output the amplified audio signals as sound (e.g., audible sound waves having a frequency between about 20 Hertz (Hz) and 20 kilohertz (kHz)). In some embodiments, the transducers 714 can comprise a single transducer. In other embodiments, however, the transducers 714 comprise a plurality of audio transducers. In some embodiments, the transducers 714 comprise more than one type of transducer. For example, the transducers 714 can include one or more low frequency transducers (e.g., subwoofers, woofers), mid-range frequency transducers (e.g., mid-range transducers, mid-woofers), and one or more high frequency transducers (e.g., one or more tweeters).

Within example implementations, the playback device 710 may operate in one of a first mode and a second mode. In the first mode, the playback device 710 operates independently of the media playback system 100. While in the second mode, the playback device 710 operates as part of the media playback system 100. Generally, the playback device 710 operates in the first mode while in the physical proximity of the media playback system 100 (e.g., while in the home) to facilitate interoperability with the playback device 110*a-n* of the media playback system 100 and operates in the second mode while "on the go," but the playback device 710 may also be operable in the second mode while in the physical proximity of the media playback system 100. The portable playback device 710 may switch between modes manually (e.g., via user input to a user interface 713) or automatically (e.g., based on proximity to one or more playback devices 110*a-n*).

In the first mode, the portable playback device 710 may interface with other devices of the media playback system 100. For instance, the portable playback device 710 may form synchrony groupings or other arrangements with the playback devices 110*a-n* and/or other portable playback devices 710 in the first mode. Further, in the first mode, the portable playback device 710 may be controlled by the control device(s) 130 in the same or similar manner as the playback device(s) 110.

In the second mode, rather than operating as one playback device of the media playback system 100, the portable playback device 710 operates independently. As noted above, this mode can be utilized "on the go" to facilitate playback away from the media playback system 100. Further, this mode can be used in proximity to the media playback system 100, which may facilitate more private use of the portable playback device 710*a*.

Figure 7C:
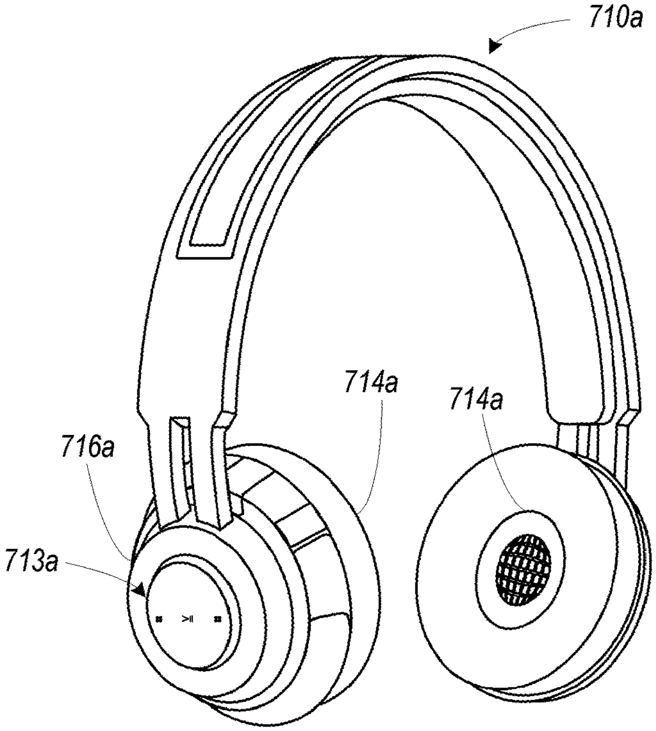
FIG. 7C is a front isometric view of a portable playback device implemented as headphones configured in accordance with aspects of the disclosed technology.

FIG. 7C is a front isometric view of an example of a portable playback device 710*a* configured in accordance with aspects of the disclosed technology. As shown in FIG. 7C, the portable playback device 710*a* is implemented as headphones to facilitate private playback as compared with the out loud playback of the playback device(s) 110. As shown, the portable playback device 710*a* (also referred to as headphones 710*a*) includes a housing 716*a* to support a pair of transducers 714*a* on or around the user's head and over the user's ears. The headphones 710*a* also include a user interface 713*a* with a touch-sensitive region to facilitate playback controls such as transport and/or volume controls.

Figure 8B:
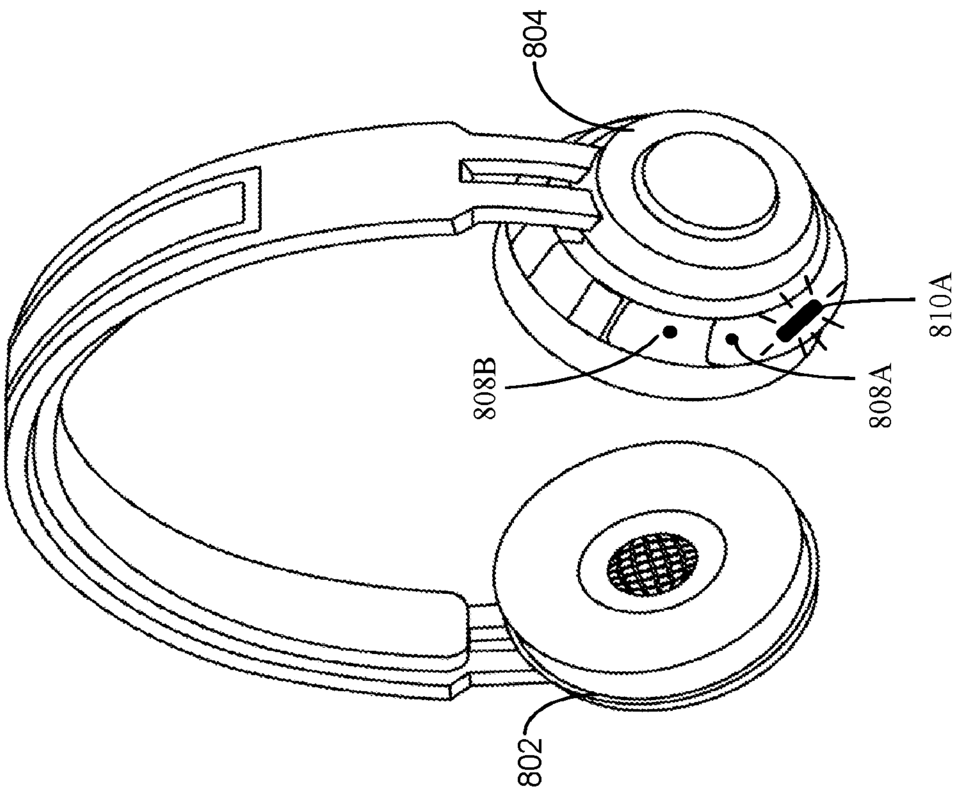
FIG. 8B is a front isometric view of a portable playback device implemented as headphones configured in accordance with aspects of the disclosed technology.
Figure 8A:
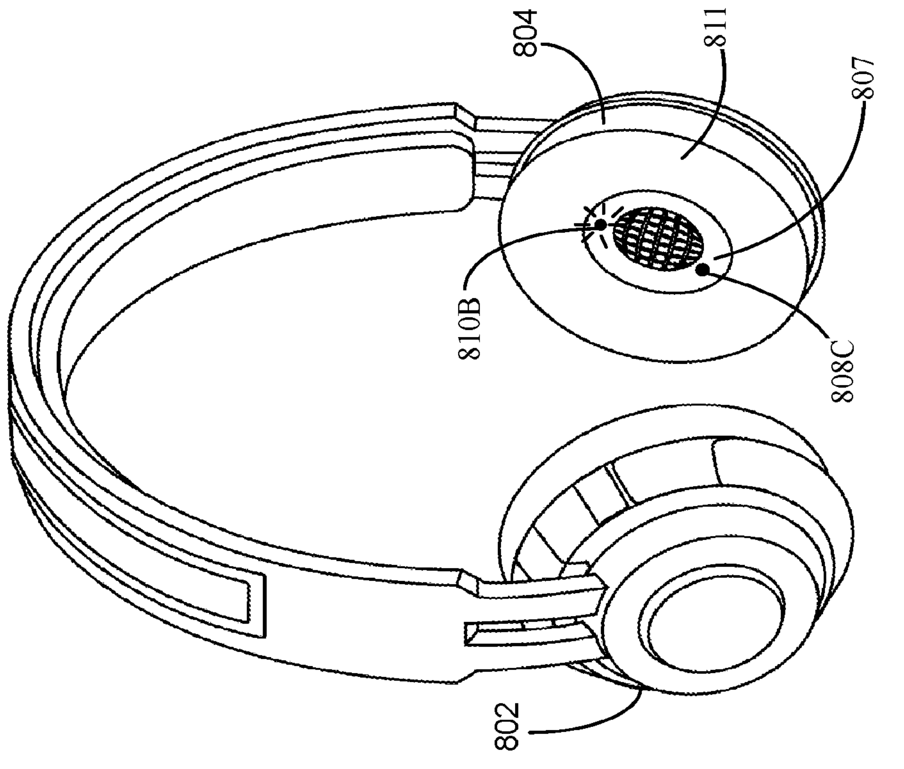
FIG. 8A is a front isometric view of a portable playback device implemented as headphones configured in accordance with aspects of the disclosed technology.

FIGS. 8A and 8B are front isometric views of the portable playback device 710*a* configured in accordance with aspects of the disclosed technology. An example of the portable playback device 710*a* includes a first earcup 802 and a second earcup 804. Each earcup (802 and 804) includes a transducer 714*a*. In an example, the second earcup 804 includes one or more microphones 808 and one or more visual indicators 810. In other examples, the microphones 808 and visual indicators 810 are arranged on the first earcup 802 or on different earcups (802 and 804).

Examples of the microphones 808 can be used for a variety of noise capturing functions such as acoustic noise cancellation (ANC), ambient audio pass-through, voice command capture, and telephony. As an example, ambient audio pass-through facilitates conveying ambient audio generated from sources outside of the portable playback device 710*a* to the transducers of the portable playback device 710*a*. In an example, one or more of the microphones 808 are arranged on an exterior of the second earcup 804. For instance, a first microphone 808A is arranged on an outside housing of the second earcup 804. An example of the first microphone 808A is configured to receive ambient noise that facilitates the performance of noise cancellation. A second microphone 808B is arranged on the outside of the second earcup 804. An example of the second microphone 808B facilitates receiving voice commands from a user of the portable playback device 710*a*. In some cases, a single microphone can facilitate the performance of one or more of noise cancellation operations, the receiving of voice commands, and the receiving of audio for telephony.

In some examples, one or more other microphones 808 are arranged on an interior of the second earcup 804. That is, the microphone(s) are arranged on the side of the earcup 804 that faces the user's ear and which cooperates with cushions 811 of the earcup 804 to encapsulate the user's ear when the portable playback device 710*a* is worn. For instance, in an example, a third microphone 808C is arranged within the second earcup 804. The third microphone 808C facilitates monitoring audio signals communicated from a speaker of the portable playback device 710*a* and can further facilitate the performance of noise cancellation, ambient audio pass-through, audio equalization, etc.

Examples of the visual indicators 810 correspond to illumination devices such as a light-emitting diode (LED) or the like. In some examples, the visual indicators 810 are configured to indicate different states. For instance, an example of a visual indicator includes a plurality of different colored LEDs (e.g., red, green, blue). Different color combinations can be activated to represent different states such as the charging state and/or battery life of the portable device 710*a*, whether the portable device 710*a* is in communication with a network and/or paired with other devices. In some examples, the visual indicators 810 indicate whether one or more microphones 808 are actively monitoring audio such as listening for voice commands, performing noise cancellation, etc.

In an example, one or more of the visual indicators 810 correspond to exterior visual indicators 810A and are arranged on an exterior of the second earcup 804. For instance, an example of the exterior visual indicator 810A indicates the charge state level (e.g., 50% full, 100% full) of the portable playback device 710*a*. An example of the exterior visual indicator 810A indicates the network/pairing state (e.g., Bluetooth® paired, WiFi Paired) of the playback device. In some instances, a single exterior visual indicator 810 is used to represent multiple states, such as battery level, power state (e.g., on or off), pairing state, etc. The state can be represented by a particular color, flashing rate, or a combination of the two.

In an example, other visual indicators 810 correspond to interior visual indicators 810B and are arranged in or on a user-facing surface 807 of an interior of the second earcup 804. That is, on the side of the earcup 804 that faces the user's ear, and that cooperates with the cushions 811 of the earcup 804 to encapsulate the user's ear when the portable playback device 710*a* is worn. In this configuration, when the portable playback device 710*a* is worn by the user, the interior visual indicator 810B is concealed such that an outside observer cannot ascertain whether the interior visual indicator 810B is illuminated. On the other hand, when the portable playback device 710*a* is, for example, laying on a table, the state of the interior visual indicator 810B (e.g., illuminated or not) can be ascertained by an outside observer having a clear line of sight to the inside of the earcup 804.

In an example, the interior visual indicator 810B is hardwired to microphone circuitry coupled to the microphones 808 such that whenever any of the microphones 808 are actively receiving and processing audio signals, the interior visual indicator 810B is illuminated. For example, when any of the first microphone 808A, the second microphone 808B, or the third microphone 808C described above is actively receiving and processing audio signals, the interior visual indicator 810B is in an illuminated state. When all of the microphones are deactivated, the interior visual indicator 810B is in an unilluminated state. Hardwiring of the interior visual indicator 810B in this manner prevents activation of the microphones without simultaneous alerting of the user of the portable playback device 710*a* that the microphones 808 are active. For example, the hardwiring as opposed to, for example, separate software activation of the interior visual indicator 810B prevents malicious activation of the microphones 808 without the user's knowledge. In some examples, the particular state that the interior visual indicator 810B is in is independent of whether the portable playback device 710*a* is being worn. That is, the interior visual indicator 810B remains illuminated or unilluminated, as the case may be, regardless of whether the user is wearing the portable playback device 710*a*.

As noted above, an example of the playback device 710*a* can receive user input (e.g., button press on the headphone, a command from a control device) that results in the muting or unmuting of the microphones 808. In response to receiving the user input, the microphone circuitry can mute or turn off one or more of the microphones 808. This, in turn, results in the interior visual indicator 810B being illuminated (i.e., when unmuting) and becoming unilluminated (i.e., when muted).

Figure 9A:
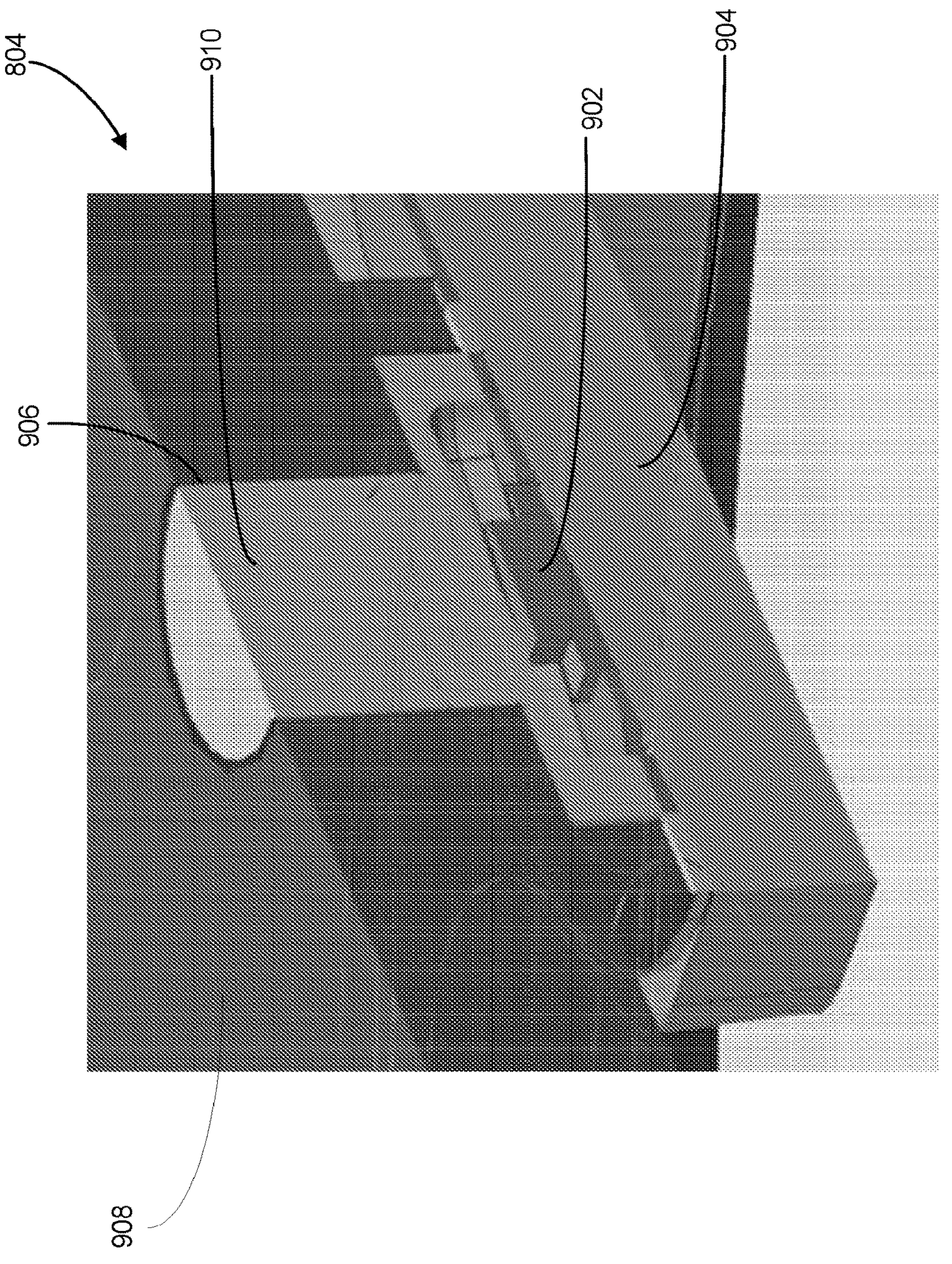
FIG. 9A is a cross-sectional view of a portion of earcup configured in accordance with aspects of the disclosed technology.

FIG. 9A is a cross-sectional view of an example of a portion of an earcup 804. The figure illustrates an example of a visual indicator 902 that can correspond to the interior visual indicator 810B. In an example, the visual indicator 902 corresponds to an LED. The visual indicator 902 is attached or coupled to a printed circuit board 904. In an example, light for the visual indicator 902 is transmitted to the user through an opening 906 in a speaker plate 908 of the earcup 804. An example of the speaker plate 908 corresponds to the user-facing surface 807 described above. The speaker plate 908 is disposed over the transducer 714*a*. In an example, an insert 910 is placed in the opening 906 that fills the opening 906. The visual indicator 902 may be aligned with opening 906 such that the light from visual indicator 902 projects through the insert 910 out of the earcup 804.

In an example, the insert 910 is formed from a material that is opaque, semi-transparent, or transparent to light to facilitate the transmission of light through the insert 910. In an example, the material corresponds to clear silicon. In another example, the material corresponds to a clear polymer material. A sealant may be added between the insert 910 and the speaker plate to acoustically seal the visual indicator 902. The acoustic seal prevents acoustic leaks that may affect acoustic performance.

Figure 9B:
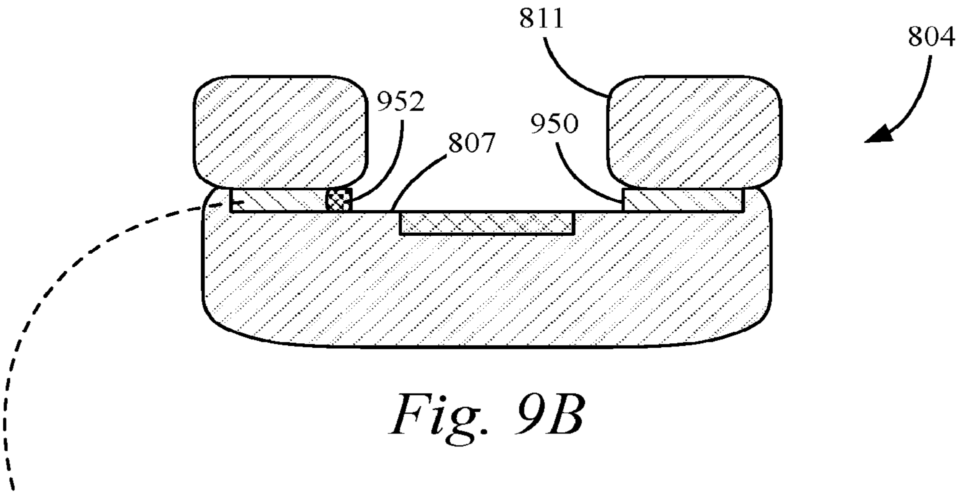
FIG. 9B is a cross-sectional view of a portion of another earcup configuration in accordance with aspects of the disclosed technology.
Figure 9C:
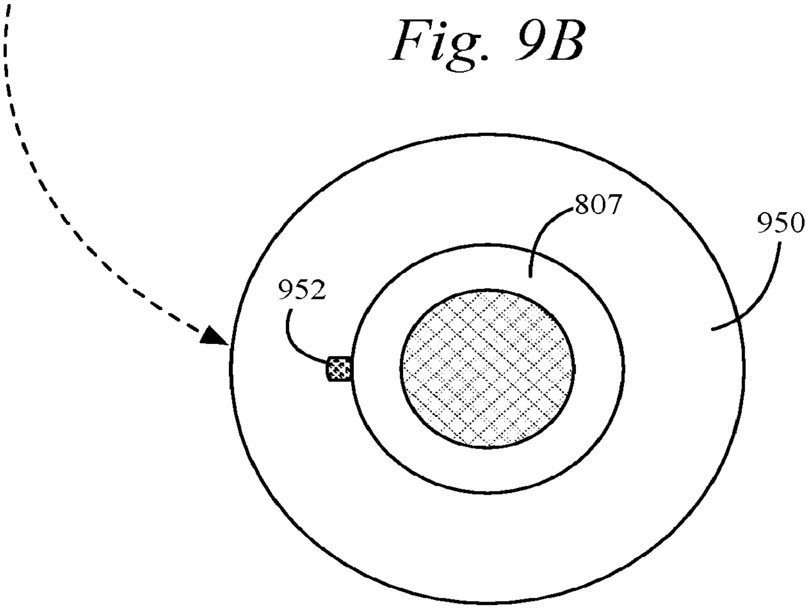
FIG. 9C illustrates a partial side-view of the earcup in accordance with aspects of the disclosed technology.
Figure 9D:
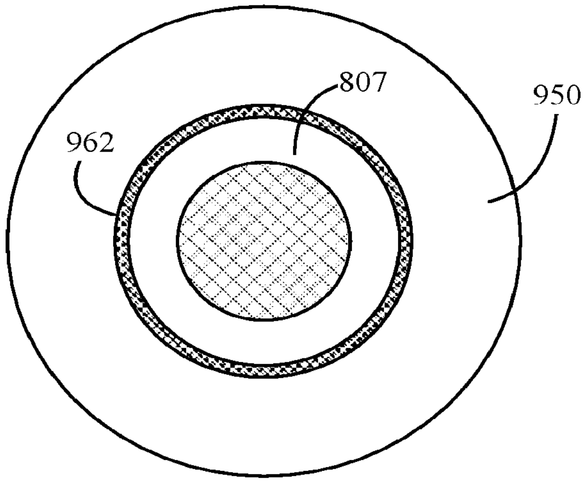
FIG. 9D illustrates a visual indicator that corresponds to a light pipe that extends along the inner circumference of a ring of an earcup in accordance with aspects of the disclosed technology.

FIG. 9B illustrates a cross-sectional view of another example of a portion of an earcup 804. FIG. 9C illustrates a partial side-view thereof without the cushions 811. As shown, the earcup 840 includes a ring 952 between the user-facing surface 807 and the cushions 811. A visual indicator 952 is provided in a section of the ring 952. An example, of the visual indicator 925 corresponds to any one of the visual indicators described above. Providing the visual indicator 925 within a side region, as shown, as opposed to within the user-facing surface 807, further conceals the state of the visual indicator 925 because the visual indicator 952 does not shine directly at the user. Rather, the light is directed towards the center of the earcup 804. In an example, the visual indicator 952 corresponds to a light pipe in optical communication with an LED. As shown in FIG. 9D, another example of the visual indicator 962 corresponds to a light pipe that extends along the entire inner circumference of the ring 952. In another example, the light pipe can extend along a lesser portion of inner circumference of the ring 952.

Figure 10A:
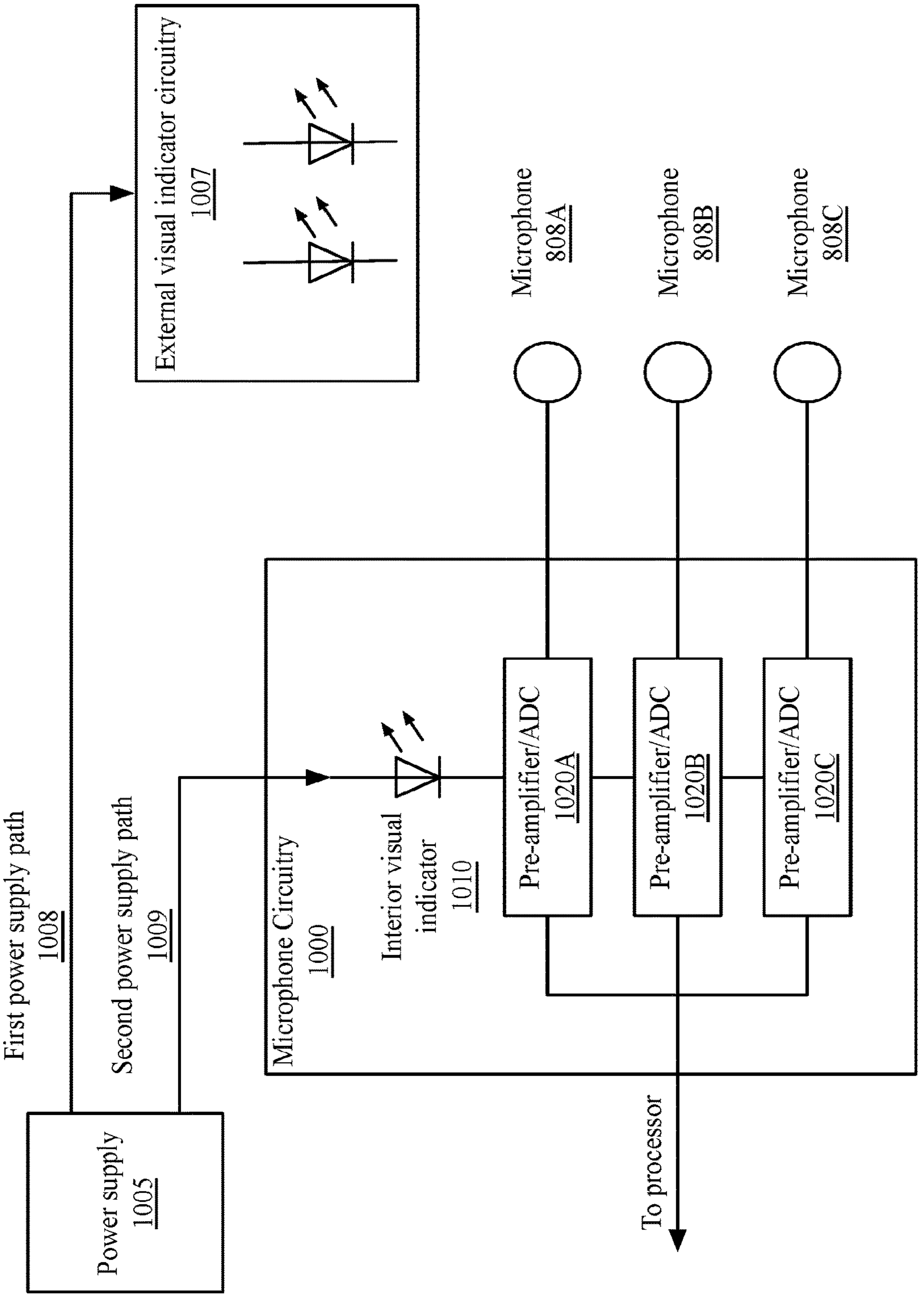
FIG. 10A illustrates a first example of microphone circuitry of the portable playback device in accordance with aspects of the disclosed technology.

FIG. 10A illustrates an example of microphone circuitry 1000 disposed within the portable playback device 710*a*. Also illustrated is an example of a power supply 1005 that supplies power via a first power supply path 1008 to external visual indicator circuitry 1007, and that supplies power via a second power supply path 1009 to the microphone circuitry 1000. The external visual indicator circuitry 1007 is configured to control and illuminate, for example, the exterior visual indicators 810A described above that are arranged on the exterior of the second earcup 804.

The microphone circuitry 1000 includes a group of pre-amplifier/analog-to-digital (ADC) circuits 1020 and a visual indicator 1010. An example of the visual indicator 1010 corresponds to the interior visual indicator 810B described above. In the example microphone circuitry 1000, each pre-amp/ADC is coupled to a microphone 808. For instance, in an example, a first pre-amp/ADC 1020A is coupled to a first microphone 808A, and the first microphone 808A is configured to receive ambient noise that facilitates the performance of noise cancellation. A second pre-amp/ADC 1020B is coupled to a second microphone 808B and the second microphone 808B facilitates receiving voice commands from a user of the portable playback device 710*a*. A third pre-amp/ADC 1020C is coupled to a third microphone 808C, and the third microphone 808C facilitates monitoring audio signals communicated from a speaker of the portable playback device 710*a* and can further facilitate the performance of noise cancellation.

In the example microphone circuitry 1000, the visual indicator 1100 corresponds to an LED, and the LED is coupled in series with the power supply 1005 of the microphone circuitry 1000. In this manner, current is required to flow through the LED to facilitate the operation of the preamp/ADC circuits 1020. This, in turn, ensures that the visual indicator 1010 is illuminated when any of the microphones is actively monitoring audio.

Figure 10B:
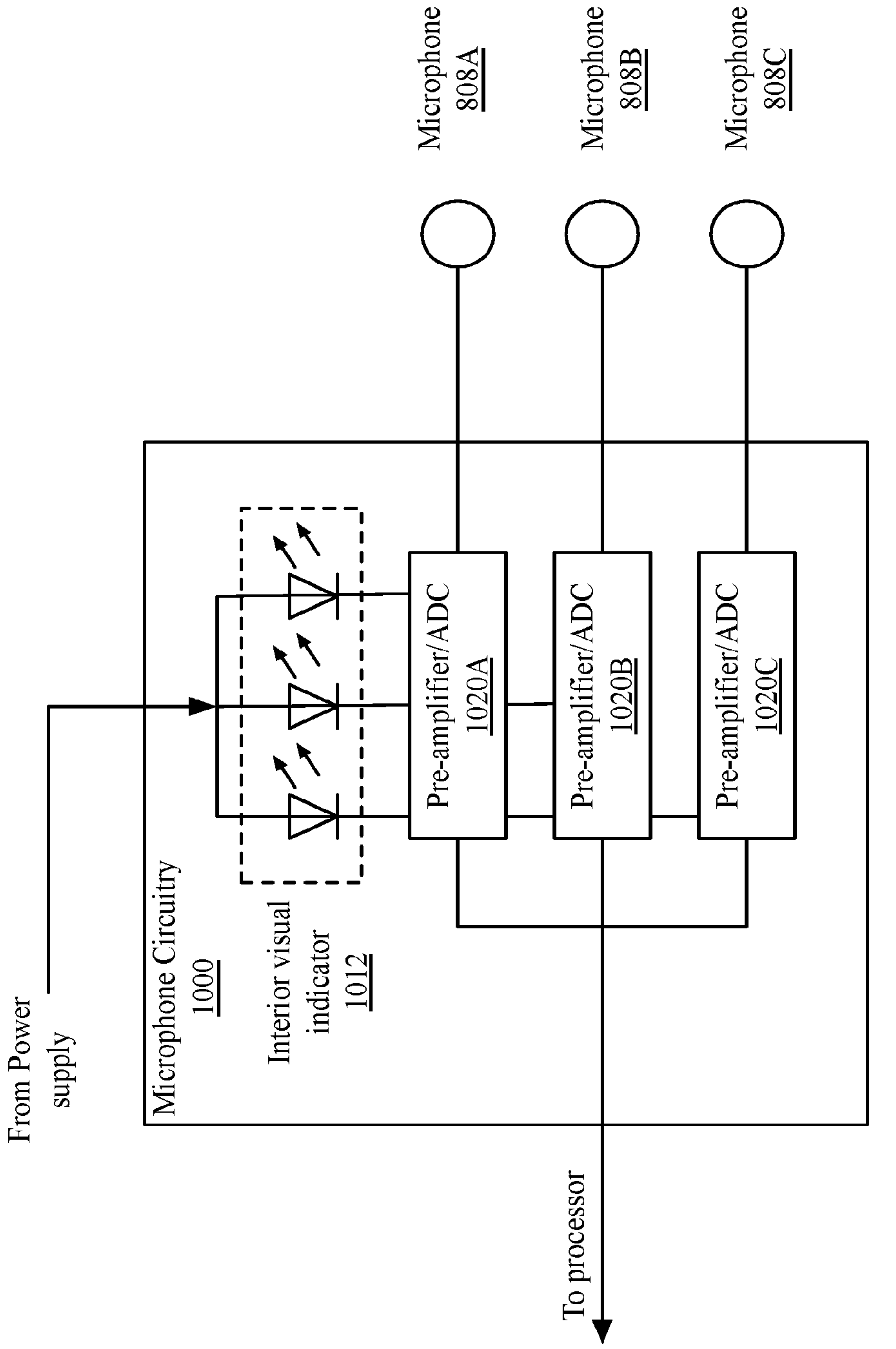
FIG. 10B illustrates a second example of microphone circuitry of the portable playback device in accordance with aspects of the disclosed technology.

FIG. 10B illustrates another example of microphone circuitry 1050. The microphone circuitry 1050 includes a group of preamp/ADC circuits 1020 and a visual indicator 1012. In this example, the visual indicator 1012 includes a group of LEDs, which facilitate indicating multiple states. For instance, in an example, each LED is coupled to a particular preamp/ADC circuit 1020 and represents the state of that circuit. In an example, each LED has a different color. This facilitates determining which microphone is actively listening via a corresponding microphone 1015.

Other examples of the microphone circuitry 1050 can represent the state of the various microphones 808 differently. For instance, in another example, a single LED is configured to flash at a periodic rate. The rate at which the LED flashes can indicate the state of the respective microphones 808. For example, a slow rate can indicate that one microphone is actively listening, and a fast rate can indicate that all of the microphones are actively listening.

Figure 10C:
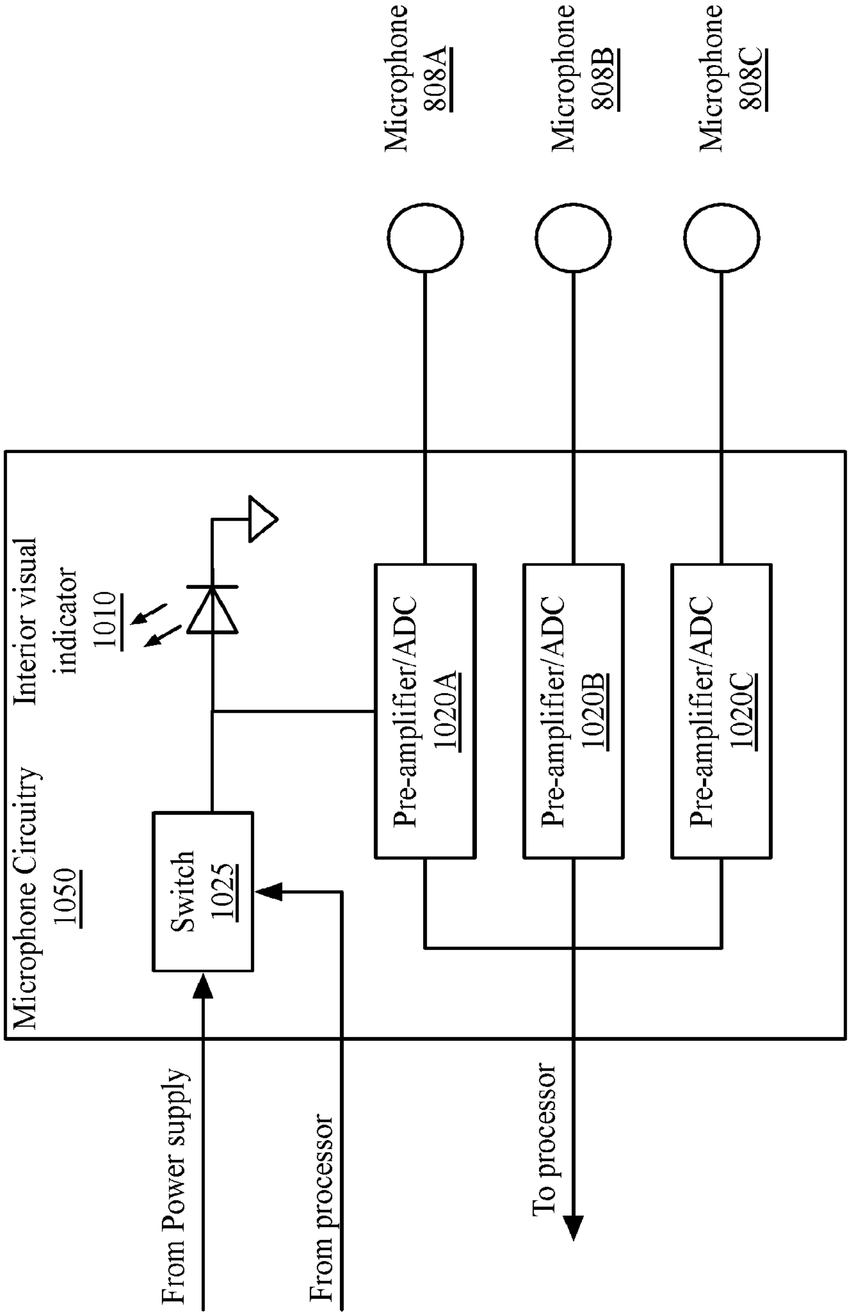
FIG. 10C illustrates a third example of microphone circuitry of the portable playback device in accordance with aspects of the disclosed technology.

FIG. 10C illustrates another example of the microphone circuitry 1050. The microphone circuitry 1050 includes a group of preamp/ADC circuits 1020, a visual indicator 1010, and a switch circuit 1025. The preamp/ADC circuits 1020 and the visual indicator 1010 can correspond to the corresponding elements described above. An example of the switch circuit 1025 receives power from the power supply and selectively applies the power to the visual indicator 1010, and the preamp/ADC circuits 1020 responsive to a signal from a processor. In this example, whenever the processor attempts to control any of the preamp/ADC circuits 1020 to operate, the visual indicator 1010 will be illuminated. For example, a software algorithm can control the processor to close the switch circuit 1025 to power the preamp/ADC circuits 1020. Doing so will cause the visual indicator 1010 to illuminate.

In some examples, the switch circuit 1025 includes a timer that operates to deactivate the preamp/ADC circuits 1020 after a predetermined amount of time to prevent the monitoring of audio content received via the microphones 808. In doing so, the visual indicator 1010 transitions to an unilluminated state. In some examples, the predetermined time is set by instruction code based on the type of audio content expected to be received. For example, the predetermined amount of time may be set to one hour or longer when noise cancellation is active. The predetermined amount of time may be set to 10 seconds when the microphones are receiving voice commands from the user. In some examples, the timer corresponds to a so-called watchdog timer that prevents continuous operation of the microphone circuitry 1050 in the case where, for example, the instruction code inadvertently leaves the microphone circuitry 1050 in an operational state and receiving audio content.

Figure 11:
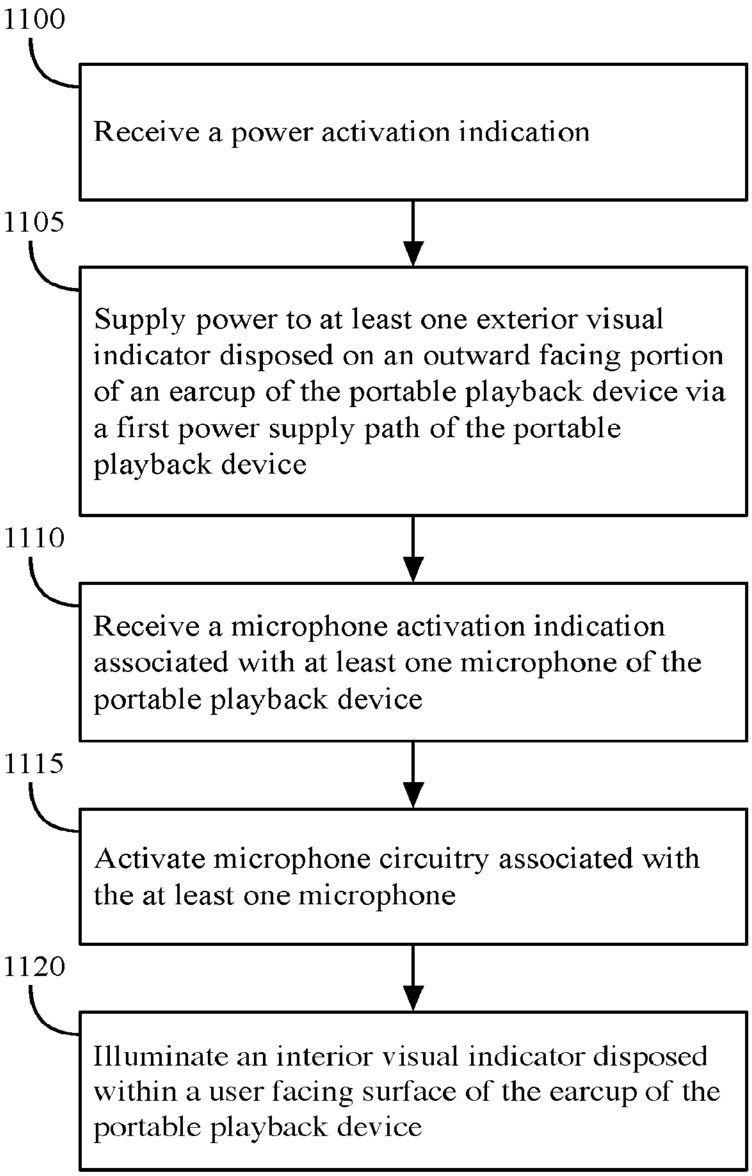
FIG. 11 illustrates operations performed by an example of the portable playback device in accordance with aspects of the disclosed technology.

FIG. 11 illustrates operations performed by an example of a portable playback device 710*a*. In this regard, the operations can be implemented via instruction code, stored in a memory of the portable playback device 710*a*, that causes one or more processors of the portable playback device to perform or assist in the performance of the various operations.

At block 1100, the portable playback device 710*a* receives a power activation indication. For example, a user of the portable playback device 710*a* may, via a user interface of the portable playback device 710*a*, cause the portable playback device 710*a* to be powered on to facilitate playback of audio content. The audio content may be streamed via WIFI, Bluetooth®, cellular, etc. The audio content may be communicated via a patch cord (e.g., 3.5 mm audio cable, data cable) that couples the portable playback device 710*a* to an audio content source, such as a HiFi receiver or a data interface providing audio data (e.g., Universal Serial Bus (USB)).

At block 1105, in response to receiving the power activation indication, power is supplied to at least one external visual indicator disposed on an outward-facing portion of an earcup of the portable playback device 710*a* via a first power supply path 1008 of the portable playback device 710*a*. For example, after receiving the power activation, the first visual indicator described above can be illuminated to indicate that the portable playback device 710*a* is powered on.

At block 1110, a microphone activation indication associated with at least one microphone of the portable playback device 710*a* is received by the portable playback device 710*a*. For example, the user of the portable playback device 710*a* may, via the user interface of the portable playback device 710*a*, control the portable playback device 710*a* to receive and processes a voice command. The user of the portable playback device 710*a* may activate noise cancellation.

In some examples, the microphone activation indication may occur by way of a controller in communication with the portable playback device 710*a* that includes a user interface with user interface elements that facilitate activation of at least one microphone. For example, the user may activate noise cancellation of the portable playback device via an app operating on a mobile device. The user may initiate or receive a phone call on a mobile device that is paired to the portable playback device 710, which causes at least one microphone to be activated.

At block 1115, microphone circuitry associated with the microphone may be activated in response to receiving the microphone activation indication. For example, in response to receiving an indication that facilitates voice commands, the second microphone 808B described above, which facilitates receiving voice commands from a user of the portable playback device 710*a*, may be activated via the microphone circuit. In response to receiving an indication that facilitates noise cancellation, the first microphone 808A or third microphone 808C, described above, which facilitates the performance of noise cancellation operations, may be activated via the microphone circuit.

In some examples, activating the microphone circuit comprises supplying power to the microphone circuit via a second power supply path 1009 that is independently operated from the first power supply path 1008. For instance, as described in FIG. 10A, a first power supply path 1008 supplies power to the external visual indicators 810, and a second power supply path 1009 supplies power to the internal visual indicator 806, described above.

At block 1120, an interior visual indicator disposed within a user-facing surface 807 of an earcup 804 of the portable playback device 710*a* may be illuminated. As noted above, the earcup is configured to encapsulate an ear of the user. When the portable playback device 710*a* is worn by the user, the state of the interior visual indicator is concealed.

In some examples, subsequent to activation of the microphone circuit, the microphone circuit is deactivated after a predetermined period of inactivity of the microphone. When the microphone circuit is deactivated, the interior visual indicator is in an unilluminated state.

In some examples, when any of the first microphone 808A, the second microphone 808B, or the third microphone 808C is actively receiving audio signals, the interior visual indicator is in an illuminated state. And when all of the first microphone 808A, the second microphone 808B, and the third microphone 808C are deactivated, the interior visual indicator is in an unilluminated state. Further, in some examples, the interior visual indicator is configured to indicate a plurality of illuminated states. For instance, in an example, a first illuminated state is associated with activation of the first microphone 808A, a second illuminated state is associated with activation of the second microphone 808B, and a third illuminate state is associated with activation of the third microphone 808C. In an example, the plurality of illuminated states correspond to different colors.

Figure 12:
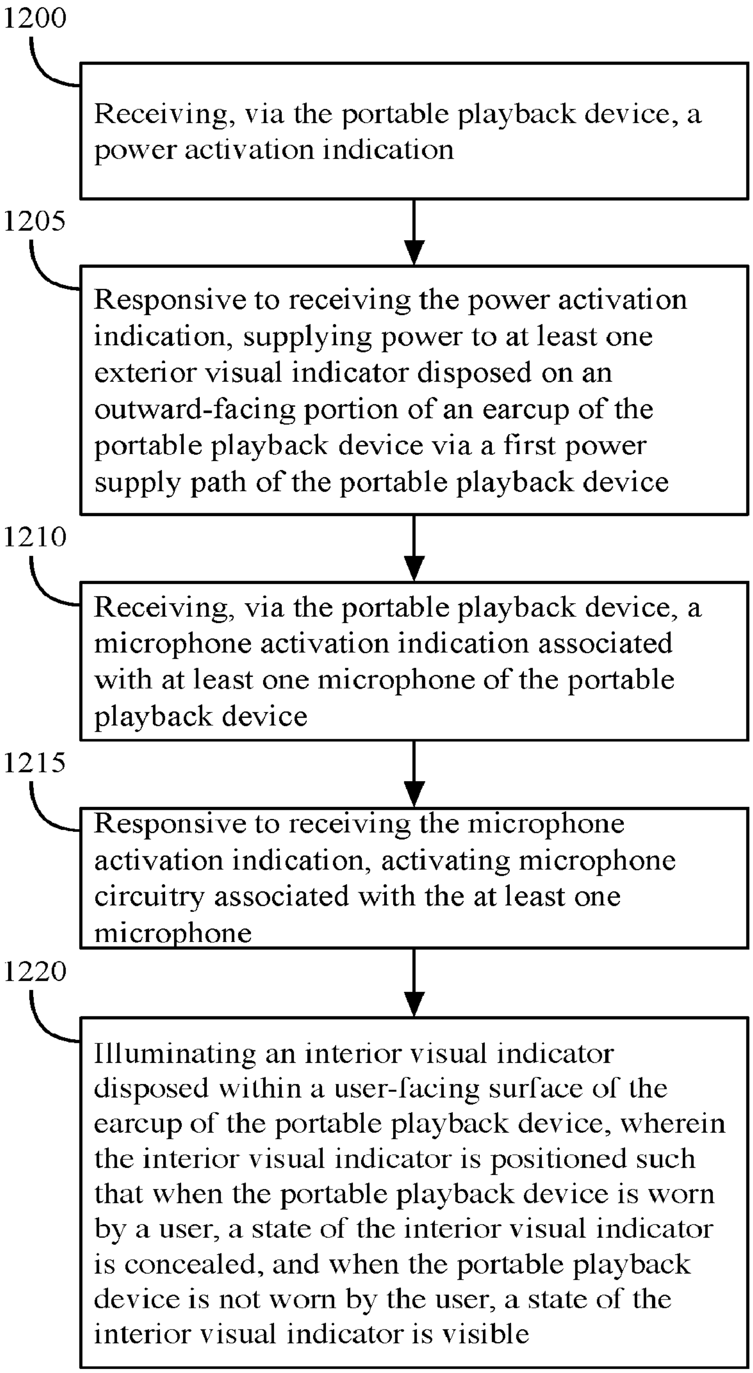
FIG. 12 illustrates operations performed by another example of the portable playback device in accordance with aspects of the disclosed technology.

FIG. 12 illustrates further operations by another example of a portable playback device 710*a*. Block 1200 involves receiving, via the portable playback device, a power activation indication.

Block 1205 involves, responsive to receiving the power activation indication, supplying power to at least one exterior visual indicator disposed on an outward-facing portion of an earcup of the portable playback device via a first power supply path of the portable playback device.

Block 1210 involves receiving, via the portable playback device, a microphone activation indication associated with at least one microphone of the portable playback device.

Block 1215 involves responsive to receiving the microphone activation indication, activating microphone circuitry associated with the at least one microphone.

Block 1220 involves illuminating an interior visual indicator disposed within a user-facing surface of the earcup of the portable playback device, wherein the interior visual indicator is positioned such that when the portable playback device is worn by a user, a state of the interior visual indicator is concealed, and when the portable playback device is not worn by the user, a state of the interior visual indicator is visible.

Some examples involve supplying power to the exterior visual indicator via a first power supply path. Wherein activating the microphone circuit further involves supplying power to the microphone circuit via a second power supply path that is independently operated from the first power supply path.

In some examples, receiving the microphone activation indication further involves receiving a user actuation via a user interface of the portable playback device to activate the at least one microphone.

In some examples, receiving the microphone activation indication further involves receiving a user actuation via a controller in communication with the portable playback device that includes a user interface with user interface elements that facilitate activation of the at least one microphone.

Some examples involve, subsequent to activation of the microphone circuit, deactivating the microphone circuit after a predetermined period of inactivity of the microphone, wherein when the microphone circuit is deactivated, the interior visual indicator transitions to an unilluminated state.

In some examples, the at least one microphone is one of a plurality of microphones that comprise: a first microphone arranged on an outside housing of the portable playback devices that is configured to receive ambient noise and facilitate performance of noise cancellation, a second microphone arranged on the outside housing that facilitates receiving voice commands from a user of the portable playback device, and a third microphone arranged within the earcup the portable playback device configured to encapsulate an ear of the user and which is configured to facilitate monitoring of audio signals communicated from a speaker of the portable playback device. The audio signals of the third microphone may be used to facilitate noise cancellation in addition to or instead of the audio signals of the first microphone.

In some examples, illuminating the interior visual indicator further involves illuminating the interior visual indicator when any of the first microphone, the second microphone, or the third microphone is actively receiving audio signals, the interior visual indicator is in an illuminated state. This example further involves transitioning the interior visual indicator to an unilluminated state when all of the first microphone, the second microphone, and the third microphone are deactivated, the interior visual indicator is in an unilluminated state.

In some examples, the interior visual indicator is configured to indicate a plurality of illuminated states, wherein a first illuminated state is associated with activation of the first microphone, a second illuminated state is associated with activation of the second microphone, and a third illuminated state is associated with activation of the third microphone.

In some examples, the plurality of illuminated states correspond to different colors.

Some examples involves maintaining a state of the interior visual indicator in an illuminated state while the state of the interior visual indicator is concealed.

In some examples, the microphone circuit is configured to control the interior visual indicator to illuminate when the microphone circuit is activated.

In some examples, the microphone circuit is configured to control the interior visual indicator to illuminate when power supply current flows into the microphone circuit.

IV. Conclusion

The above discussions relating to portable playback devices, playback devices, control devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:
- at least one processor;
- at least one earcup;
- microphone circuitry that comprises at least one pre-amplifier, at least one visual indicator, and a switch circuit that when actuated simultaneously routes power to the at least one pre-amplifier and the at least one visual indicator, wherein the at least one visual indicator is positioned such that the at least one visual indicator is visible via an opening in the at least one earcup of the playback device;
- at least one microphone disposed on the at least one earcup and in electrical communication with the at least one pre-amplifier of the microphone circuitry;
- tangible, non-transitory computer-readable memory having program instructions stored therein, wherein the program instructions are executable by the at least one processor to configure the playback device to:
  - receive a microphone activation indication associated with at least one microphone of the playback device; and
  - after receiving the microphone activation indication, cause the at least one processor to actuate the switch circuit of the microphone circuitry to thereby simultaneously activate the at least one pre-amplifier and to illuminate the at least one visual indicator.

2. The playback device according to claim 1, wherein the program instructions that are executable by the at least one processor to configure the playback device to receive the microphone activation indication comprise program instructions executable by the at least one processor to configure the playback device to:

receive a user actuation via a user interface of the playback device to activate the at least one microphone.

3. The playback device according to claim 1, wherein the program instructions that are executable by the at least one processor to configure the playback device to receive the microphone activation indication comprise program instructions executable by the at least one processor to configure the playback device to:

receive a user actuation via a controller in communication with the playback device that includes a user interface with user interface elements that facilitate activation of the at least one microphone.

4. The playback device according to claim 1, wherein the program instructions are executable by the at least one processor to configure the playback device to:

subsequent to activation of the microphone circuitry, deactivate the microphone circuitry after a predetermined period of inactivity of the at least one microphone, wherein when the microphone circuitry is deactivated, the at least one visual indicator transitions to an unilluminated state.

5. The playback device according to claim 1, wherein the at least one microphone is one of a plurality of microphones that comprises:

a first microphone arranged on an outside housing of the playback device that is configured to receive ambient noise and facilitate performance of noise cancellation, a second microphone arranged on the outside housing that facilitates receiving voice commands from a user of the playback device, and a third microphone arranged on the at least one earcup the playback device configured to monitor audio signals communicated from a speaker of the playback device.

6. The playback device according to claim 5, wherein when any of the first microphone, the second microphone, or the third microphone is actively receiving audio signals, the at least one visual indicator is in an illuminated state, and when all of the first microphone, the second microphone, and the third microphone are deactivated, the at least one visual indicator is in an unilluminated state.

7. The playback device according to claim 5, wherein the at least one visual indicator is configured to indicate a plurality of illuminated states, wherein a first illuminated state is associated with activation of the first microphone, a second illuminated state is associated with activation of the second microphone, and a third illuminated state is associated with activation of the third microphone.

8. The playback device according to claim 7, wherein the plurality of illuminated states corresponds to different colors.

9. The playback device according to claim 1, further comprising wireless communication circuitry that facilitate wireless playback of audio content.

10. The playback device according to claim 9, wherein the playback device is a member of a playback system that includes one or more other playback devices, wherein the wireless communication circuitry facilitates playing back the audio content in synchrony with one or more of the one or more other playback devices of the playback system.

11. Non-transitory computer-readable media having program instructions stored therein, wherein the program instructions are executable by at least one processor of a playback device to configure the playback device to:

receive a microphone activation indication associated with at least one microphone of the playback device; and after receiving the microphone activation indication, cause the at least one processor to actuate a switch circuit of microphone circuitry, wherein when actuated, the switch circuit simultaneously routes power to at least one pre-amplifier and at least one visual indicator of the microphone circuitry to thereby simultaneously activate the at least one pre-amplifier and illuminate the at least one visual indicator, wherein the at least one visual indicator is positioned such that the at least one visual indicator is visible via an opening in at least one earcup of the playback device.

12. The non-transitory computer-readable media according to claim 11, wherein the program instructions that are executable by the at least one processor to configure the playback device to receive the microphone activation indication comprise program instructions executable by the at least one processor to configure the playback device to:

receive a user actuation via a user interface of the playback device to activate the at least one microphone.

13. The non-transitory computer-readable media according to claim 11, wherein the program instructions that are executable by the at least one processor to configure the playback device to receive the microphone activation indication comprise program instructions executable by the at least one processor to configure the playback device to:

receive a user actuation via a controller in communication with the playback device that includes a user interface with user interface elements that facilitate activation of the at least one microphone.

14. The non-transitory computer-readable media according to claim 11, wherein the program instructions are executable by the at least one processor to configure the playback device to:

subsequent to activation of the microphone circuitry, deactivate the microphone circuitry after a predetermined period of inactivity of the at least one microphone, wherein when the microphone circuitry is deactivated, the at least one visual indicator transitions to an unilluminated state.

15. The non-transitory computer-readable media according to claim 11, wherein the at least one microphone is one of a plurality of microphones that comprises:

a first microphone arranged on an outside housing of the playback device that is configured to receive ambient noise and facilitate performance of noise cancellation, a second microphone arranged on the outside housing that facilitates receiving voice commands from a user of the playback device, and a third microphone arranged on the at least one earcup the playback device configured to monitor audio signals communicated from a speaker of the playback device.

16. The non-transitory computer-readable media according to claim 15, wherein when any of the first microphone, the second microphone, or the third microphone is actively receiving audio signals, the at least one visual indicator is in an illuminated state, and when all of the first microphone, the second microphone, and the third microphone are deactivated, the at least one visual indicator is in an unilluminated state.

17. The non-transitory computer-readable media according to claim 15, wherein the at least one visual indicator is configured to indicate a plurality of illuminated states, wherein a first illuminated state is associated with activation of the first microphone, a second illuminated state is associated with activation of the second microphone, and a third illuminated state is associated with activation of the third microphone.

18. The non-transitory computer-readable media according to claim 17, wherein the plurality of illuminated states corresponds to different colors.

19. The non-transitory computer-readable media according to claim 11, further comprising wireless communication circuitry that facilitate wireless playback of audio content.

20. The non-transitory computer-readable media according to claim 19, wherein the playback device is a member of a playback system that includes one or more other playback devices, wherein the wireless communication circuitry facilitates playing back the audio content in synchrony with one or more of the one or more other playback devices of the playback system.

* * * * *